US008023129B2

(12) United States Patent  
Kawai et al.

(10) Patent No.: US 8,023,129 B2  
(45) Date of Patent: Sep. 20, 2011

(54) INFORMATION PROCESSING DEVICE FOR BALANCING PRINTING LOADS CONNECTED TO A PLURALITY OF PRINTING DEVICES, NETWORK PRINTING SYSTEM FOR A PLURALITY OF PRINTING DEVICES, AND COMPUTER PROGRAM FOR INFORMATION PROCESSING DEVICE CONNECTED TO A PLUARLITY OF PRINTING DEVICES

(75) Inventors: Sunao Kawai, Toyoake (JP); Kan Ishimoto, Nagoya (JP); Yuji Miyata, Nishikasugai-gun (JP); Toshiaki Mizutani, Kasugai (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 1267 days.

(21) Appl. No.: 10/886,682

(22) Filed: Jul. 9, 2004

(65) Prior Publication Data

US 2004/0239992 A1 Dec. 2, 2004

Related U.S. Application Data

(63) Continuation-in-part of application No. PCT/JP03/00174, filed on Jan. 10, 2003.

(30) Foreign Application Priority Data

Jan. 10, 2002 (JP) ................................ 2002-003745

(51) Int. Cl.  
*G06F 3/12* (2006.01)

(52) U.S. Cl. ...................... 358/1.15; 358/1.13; 358/1.14; 718/105

(58) Field of Classification Search ................. 358/1.15, 358/1.14, 1.13; 718/105  
See application file for complete search history.

(56) References Cited

U.S. PATENT DOCUMENTS

| 5,657,448 | A | | 8/1997 | Wadsworth et al. | |
|---|---|---|---|---|---|
| 5,978,560 | A | * | 11/1999 | Tan et al. | 358/1.15 |
| 6,058,277 | A | | 5/2000 | Strefkerk et al. | |
| 6,229,622 | B1 | * | 5/2001 | Takeda | 358/1.16 |
| 6,930,795 | B1 | * | 8/2005 | Motamed et al. | 358/1.18 |
| 7,042,585 | B1 | * | 5/2006 | Whitmarsh et al. | 358/1.15 |
| 7,239,408 | B1 | * | 7/2007 | Whitmarsh et al. | 358/1.15 |
| 7,256,900 | B1 | * | 8/2007 | Hanaoka | 358/1.12 |

FOREIGN PATENT DOCUMENTS

| EP | 0 605 091 A2 | 7/1994 |
|---|---|---|
| EP | 0 889 391 A1 | 1/1999 |
| JP | A 6-183101 | 7/1994 |
| JP | A 11-154069 | 6/1999 |
| JP | A 11-203092 | 7/1999 |

(Continued)

*Primary Examiner* — Chan S Park  
*Assistant Examiner* — Jacky X Zheng  
(74) *Attorney, Agent, or Firm* — Oliff & Berridge PLC

(57) ABSTRACT

A server acquires the total number of pages printed per hour and the number of pages printed per hour by each user on each printer in a network printing system in order to find printers whose hourly number of printed pages exceeds a load limit. The server also looks for printers having few printed pages per hour that do not exceed the load limit and issues a notification advising the user who is printing the largest volume on a printer exceeding the load limit to switch to a printer that prints few pages. Accordingly, a high concentration of printing found on a few printers can be moderated, reducing user wait time and excessive printer load.

49 Claims, 33 Drawing Sheets

FOREIGN PATENT DOCUMENTS

| | | |
|---|---|---|
| JP | A 2000-231465 | 8/2000 |
| JP | A 2000-305723 | 11/2000 |
| JP | A 2000-347827 | 12/2000 |
| JP | 2001209510 A * | 8/2001 |
| JP | A 2001-209510 | 8/2001 |
| JP | A 2002-196897 | 7/2002 |
| WO | WO 01/31432 A1 | 5/2001 |

* cited by examiner

FIG.3

| NAME | MODEL | IP ADDRESS | GATEWAY | SUBNET |
|---|---|---|---|---|
| PRINTER 1 | △△ YYY-1800 | 100.1.101.111 | 100.1.255.255 | 255.0.0.0 |
| PRINTER 2 | ○○ XXX-15000 | 100.22.102.102 | 100.22.255.255 | 255.255.0.0 |
| PRINTER 3 | △△ YYY-2000 | 100.33.103.103 | 100.33.255.255 | 255.255.0.0 |
| PRINTER 4 | ×× PPP-50 | 100.44.104.104 | 100.44.255.255 | 255.255.0.0 |

FIG.4

ADVICE SETUP

☐ Enable Layout Advice Function

[ Options ]

[ Notification Setup ]

・ADVICE NOTIFICATION SCHEDULE

☐ Run Now

○ Daily    Time ☐ : ☐

○ Weekly    Day ☐ . Time ☐ : ☐

○ Monthly    Date ☐ . Time ☐ : ☐

[ Exception Period Setup ]

ADVICE TYPE

○ Entire Network

⦿ Equalize Load Among Groups [ ]

[ Group Setup ]

[ Accept ]     [ Cancel ]

FIG.5

OPTIONS SETUP

・ADVICE CRITERIA SETUP

- ⦿ Equalize Load
  - ⦿ Equalize Printing Time
    (Print most jobs on fast printers)
  - ○ Equalize Paper Loading Frequency
    (Print most jobs on printers with large tray capacity)
  - ○ Equalize Toner Replacement Frequency
    (Print most jobs on printers with large toner capacity)
- ○ Reduce Costs
- ○ Optimize Usage Locations

[ Load Limit Setting ]

・ALLOWABLE ERROR FOR EXCHANGE

| ☐ Printing Speed | Difference less than [        ] ppm |
| ☐ Resolution    | Difference less than [        ] dpi |
| ☐ Tray Capacity | Difference less than [        ] pages |
| ☐ Only the same engine type |
| ☐ Color         | Difference less than [    ] colors |

・PRIORITY SETTINGS

☐ Use Printer in which a sheet having one surface printed is filed

☐ Use Printers at Installation Site [        ]

[ Accept ]   [ Cancel ]

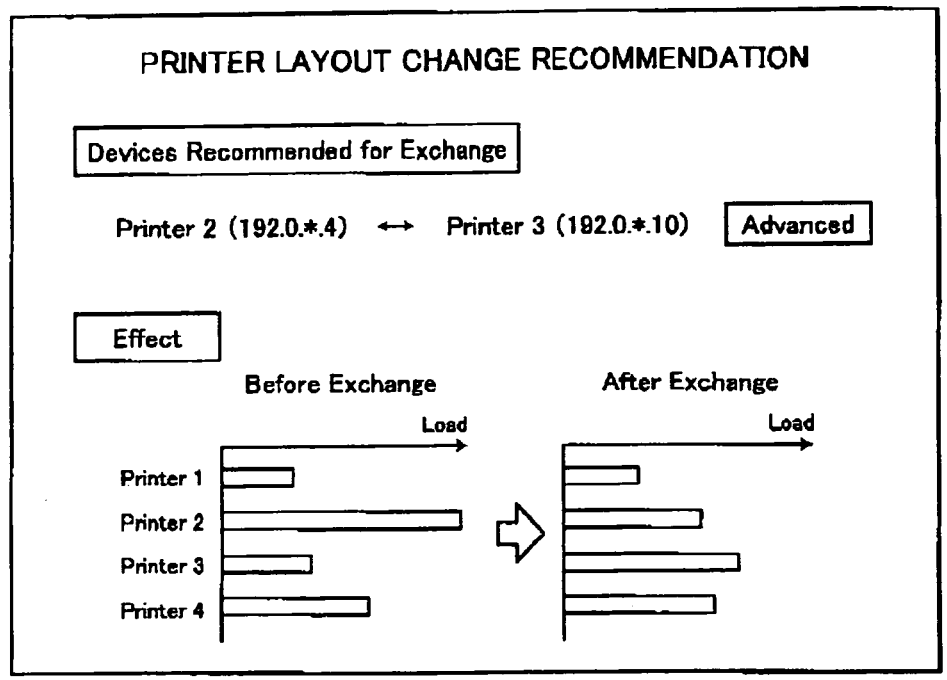

FIG.12

```
PRINTER LAYOUT CHANGE RECOMMENDATION    Issued __/__/__

It is recommended that the layout positions of the following printers
be exchanged based on usage from __/__/__ to __/__/__ .

EXCHANGE PRINTER NO. 2 AND PRINTER NO. 3

Printer 2
   Model    OO  XXX-1500
   IP       100.22.102.102
   Gateway  100.22.255.255
   Subnet   255.255.0.0

Printer 3
   Model    △△  YYY-2000
   IP       100.33.103.103
   Gateway  100.33.255.255
   Subnet   255.255.0.0

USAGE (from __/__/__ to __/__/__ )

Model       No. pages/day    Printing speed    Load
   Printer 1       150               25            6.0
   Printer 2       200               10           20.0
   Printer 3       100               15            6.7
   Printer 4       250               20           12.5

Total Load = 45.2

AFTER EXCHANGE

Model       No. pages/day    Printing speed    Load
   Printer 1       150               25            6.0
   Printer 2       200               10           10.0
   Printer 3       200               15           13.3
   Printer 4       250               20           12.5

Total Load = 41.8

By making this exchange, the overall load can be reduced by 3.4.
```

FIG.14

PRINTER TEST PAGE

XX-2500
    FW Ver. 1. 2 (2001. 12. 3)
    Boot Ver. 2. 4
    Ethernet: 00-90-33-1E-84-89

| | |
|---|---|
| TCP/IP | Enable |
| AppleTalk | Enable |
| NetBIOS/IP | Enable |
| | |
| IP address | 192. 0. 2. 1 |
| Subnet mask | 255. 255. 215. 0 |
| IP Gateway | 192. 0. *. 254 |
| | |
| Ethernet Mode | Auto |
| | |
| No. of printed pages | 3296 |

The load on this printer is high.
Recommend switching with 192. 0. 2. 4 printer.

View a detailed report at the following URL
http://192. 0. 2. 45/report. html

| PRINTER 1 | PRINTER 2 | PRINTER 3 | PRINTER 4 |
|---|---|---|---|
| Tray<br>Size 250<br>Type A | Tray<br>Size 100<br>Type B | Tray<br>Size 150<br>Type A | Tray<br>Size 200<br>Type C |
| Total No. Pages:<br>150 pages/day | Total No. Pages:<br>200 pages/day | Total No. Pages:<br>100 pages/day | Total No. Pages:<br>250 pages/day |

FIG.21(b)

| PRINTER 1 | PRINTER 2 | PRINTER 3 | PRINTER 4 |
|---|---|---|---|
| Tray<br>Size 250<br>Type A | Tray<br>Size 100<br>Type B | Tray<br>Size 150<br>Type A | Tray<br>Size 200<br>Type C |
| Total No. Pages:<br>150 pages/day | Total No. Pages:<br>100 pages/day | Total No. Pages:<br>200 pages/day | Total No. Pages:<br>250 pages/day |

FIG.22

LOAD LIMIT     1.5

Accept     Cancel

FIG.25(a)

| GROUP 1 | GROUP 2 | GROUP 3 | GROUP 4 |
|---|---|---|---|
| Total No. of Pages: 150 pages/day | Total No. of Pages: 300 pages/day | Total No. of Pages: 200 pages/day | Total No. of Pages: 120 pages/day |
| Printer 1  10 ppm<br>Printer 2  12 ppm<br>Printer 3  10 ppm | Printer 4  10 ppm<br>Printer 5  16 ppm<br>Printer 6  12 ppm<br>Printer 7  10 ppm | Printer 8  18 ppm<br>Printer 9  16 ppm<br>Printer 10  12 ppm<br>Printer 11  14 ppm<br>Printer 12  10 ppm | Printer 13  14 ppm<br>Printer 14  16 ppm |

FIG.25(b)

| GROUP 1 | GROUP 2 | GROUP 3 | GROUP 4 |
|---|---|---|---|
| Total No. of Pages: 150 pages/day | Total No. of Pages: 300 pages/day | Total No. of Pages: 200 pages/day | Total No. of Pages: 120 pages/day |
| Printer 1  10 ppm<br>Printer 2  12 ppm<br>Printer 3  10 ppm | Printer 8  18 ppm<br>Printer 5  16 ppm<br>Printer 6  12 ppm<br>Printer 9  16 ppm | Printer 4  10 ppm<br>Printer 7  10 ppm<br>Printer 10  12 ppm<br>Printer 11  14 ppm<br>Printer 12  10 ppm | Printer 13  14 ppm<br>Printer 14  16 ppm |

FIG.27(a)

| GROUP 1 | GROUP 2 | GROUP 3 | GROUP 4 |
|---|---|---|---|
| Total No. of Pages: 200 pages/day | Total No. of Pages: 300 pages/day | Total No. of Pages: 100 pages/day | Total No. of Pages: 120 pages/day |
| Printer 1  10 ppm<br>Printer 2  12 ppm<br>Printer 3  12 ppm | Printer 4  10 ppm<br>Printer 5  16 ppm<br>Printer 6  12 ppm | Printer 7  10 ppm<br>Printer 8  18 ppm<br>Printer 9  10 ppm<br>Printer 10  12 ppm<br>Printer 11  14 ppm<br>Printer 12  16 ppm | Printer 13  14 ppm<br>Printer 14  16 ppm<br>Printer 15  12 ppm |

FIG.27(b)

| GROUP 1 | GROUP 2 | GROUP 3 | GROUP 4 |
|---|---|---|---|
| Total No. of Pages: 200 pages/day | Total No. of Pages: 300 pages/day | Total No. of Pages: 100 pages/day | Total No. of Pages: 120 pages/day |
| Printer 1  10 ppm<br>Printer 2  12 ppm<br>Printer 3  12 ppm<br>Printer 15  12 ppm | Printer 4  10 ppm<br>Printer 5  16 ppm<br>Printer 6  12 ppm<br>Printer 8  18 ppm<br>Printer 11  14 ppm | Printer 7  10 ppm<br>Printer 9  10 ppm<br>Printer 10  12 ppm<br>Printer 12  16 ppm | Printer 13  14 ppm<br>Printer 14  16 ppm |

FIG.32(a)

PRINTER 1

Printing Speed: 12 ppm
Installation Site:
   Worksite A, 5th Floor
Colors:        Monochrome
Engine:        Ink
Resolution:    800 dpi
Paper having
one printed surface:  No
Tray Capacity: 150 sheets
Total Printed Pages:
               60 pages/hour
User A:        10 pages/hour
User B:        30 pages/hour
User C:        20 pages/hour

PRINTER 2

Printing Speed: 15 ppm
Installation Site:
   Worksite A, 3rd Floor
Colors:        6 colors
Engine:        Laser
Resolution:    1200 dpi
Paper having
one printed surface:  Yes
Tray Capacity: 100 sheets
Total Printed Pages:
               110 pages/hour
User D:        40 pages/hour
User E:        30 pages/hour
User F:        20 pages/hour
User G:        20 pages/hour

PRINTER 3

Printing Speed: 14 ppm
Installation Site:
   Worksite A, 3rd Floor
Colors:        5 colors
Engine:        Laser
Resolution:    1200 dpi
Paper having
one printed surface:  Yes
Tray Capacity: 200 sheets
Total Printed Pages:
               40 pages/hour
User A:        30 pages/hour
User H:        10 pages/hour

PRINTER 4

Printing Speed: 10 ppm
Installation Site:
   Worksite B, 1st Floor
Colors:        4 colors
Engine:        Ink
Resolution:    600 dpi
Paper having
one printed surface:  No
Tray Capacity: 100 sheets
Total Printed Pages:
               30 pages/hour
User F:        10 pages/hour
User I:        20 pages/hour

FIG.34

PRINTER 1

Printing Speed: 12 ppm
Installation Site:
　　Worksite A, 5th Floor
Colors: Monochrome
Engine: Ink
Resolution: 600 dpi
Paper having
one printed surface: No
Cost: 1 yen/page
Total Printed Pages:
　　80 pages/hour
User A: 10 pages/hour
User B: 30 pages/hour
User C: 20 pages/hour

PRINTER 2

Printing Speed: 15 ppm
Installation Site:
　　Worksite A, 3rd Floor
Colors: 6 colors
Engine: Laser
Resolution: 1200 dpi
Paper having
one printed surface: Yes
Cost: 7 yen/page
Total Printed Pages:
　　110 pages/hour
User D: 40 pages/hour
User E: 30 pages/hour
User F: 20 pages/hour
User G: 20 pages/hour

PRINTER 3

Printing Speed: 14 ppm
Installation Site:
　　Worksite A, 3rd Floor
Colors: 5 colors
Engine: Laser
Resolution: 1200 dpi
Paper having
one printed surface: Yes
Cost: 5 yen/page
Total Printed Pages:
　　40 pages/hour
User A: 30 pages/hour
User H: 10 pages/hour

PRINTER 4

Printing Speed: 10 ppm
Installation Site:
　　Worksite B, 1st Floor
Colors: 4 colors
Engine: Ink
Resolution: 600 dpi
Paper having
one printed surface: No
Cost: 2 yen/page
Total Printed Pages:
　　30 pages/hour
User F: 10 pages/hour
User I: 20 pages/hour

FIG.35

EXCEPTION PERIOD SETUP

○ Daily    From ☐ : ☐ To ☐ : ☐

○ Weekly    Day ☐, From ☐ : ☐ To ☐ : ☐

● Monthly    Date ☐ (■ End of month), From [17] : [00] To [20] : [00]

○ Annually
    Month ☐, Day ☐ (☐ End of month), From ☐ : ☐ To ☐ : ☐

FIG.36

EXCEPTION PERIOD LIST

| NAME | FREQUENCY | PERIOD |
|---|---|---|
| Flexible Output Period Reports | Monthly<br>Weekly | End of Month 17:00 ~ 20:00<br>Friday         17:00 ~ 20:00 |

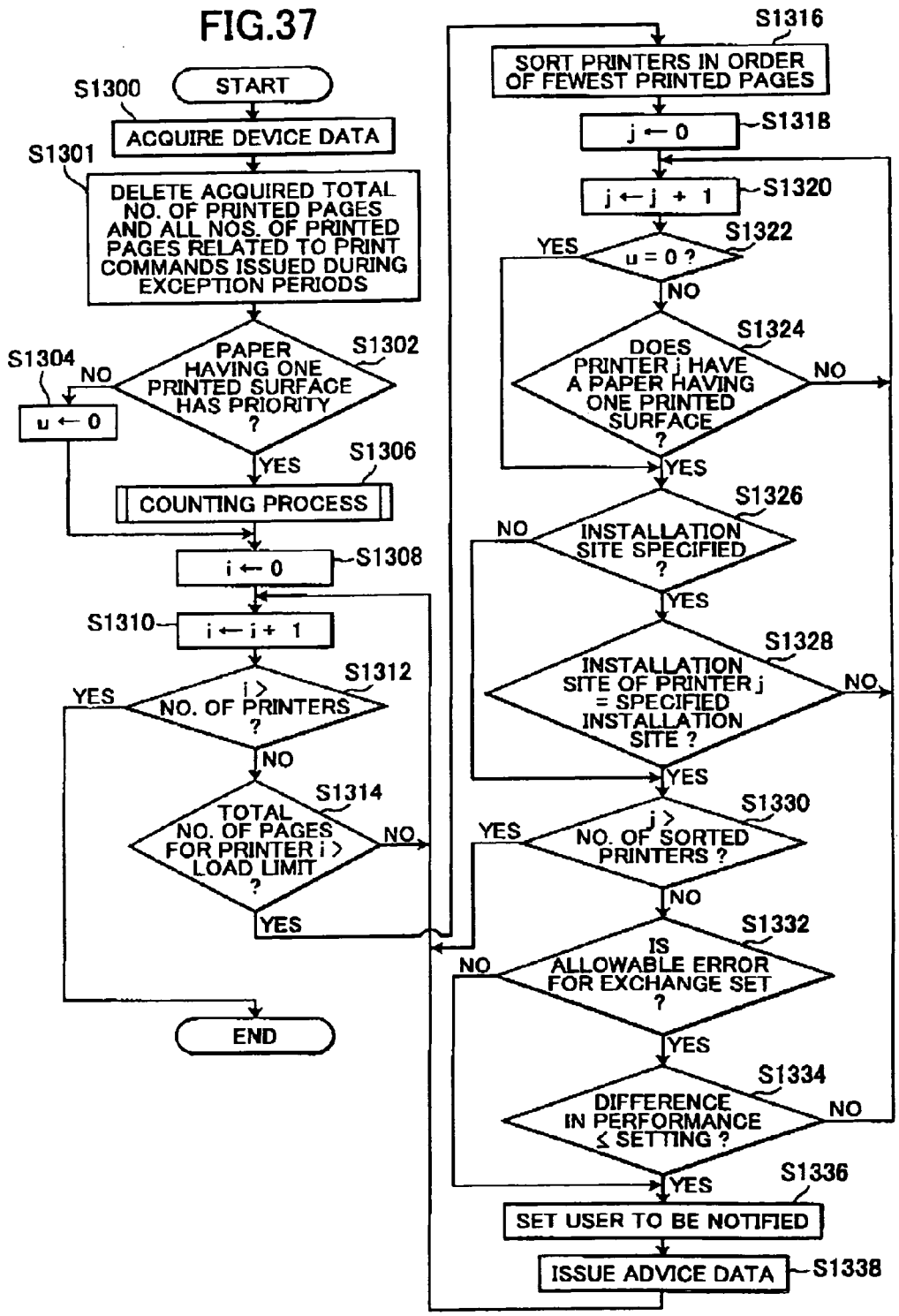

INFORMATION PROCESSING DEVICE FOR BALANCING PRINTING LOADS CONNECTED TO A PLURALITY OF PRINTING DEVICES, NETWORK PRINTING SYSTEM FOR A PLURALITY OF PRINTING DEVICES, AND COMPUTER PROGRAM FOR INFORMATION PROCESSING DEVICE CONNECTED TO A PLUARLITY OF PRINTING DEVICES

CROSS-REFERENCE TO RELATED APPLICATION

This application is continuation-in-part based upon International Application No. PCT/JP03/00174 filed on Jan. 10, 2003 by Sunao Kawai et al., which designates the United States and is not published in English language, and claims the benefit of Japanese Patent Application No. 2002-3745 filed on Jan. 10, 2002, the entire contents of which are incorporated by reference herein.

TECHNICAL FIELD

The present invention relates to a network printing system including a plurality of printers and at least one terminal. The present invention also relates to an information processing device and a computer program that process information concerning the network printing system.

BACKGROUND OF THE INVENTION

In a network printing system having a plurality of printing devices (such as printers) and a plurality of terminals (such as personal computers) that are connected via a network, a user at each terminal performs printing operations by selecting a printing device located nearby, for example. Printing conditions such as number of pages to print and period of use usually differ according to the user and the printing device. Further, printing devices often have different printing speeds and paper tray capacities.

However, when users are allowed to select a printing device on their own, some printing devices may be used infrequently despite having a fast printing speed, while other printing devices may receive a high concentration of print jobs despite having a slow printing speed. An excessive concentration of print jobs on a particular printer may force users to wait needlessly and may cause the printing device to break down. These types of problems can be avoided by changing the installation layout of the printing devices and the printing destinations used by the terminals or by distributing print jobs. Such actions can also be taken to reduce printing costs. Specifically, the overall cost of the system can be reduced by using primarily economical printing devices.

However, modifications in the printing device layout and job distribution have been charged to administrators of the network printing system, forcing these administrators to bear an unreasonable work load. Further, when constructing a new network, it is necessary to plan the arrangement of printing devices and terminals with consideration for load distribution and cost reductions. However, such planning is often complicated and imposes an unreasonable workload on the administrators even before the network is constructed.

Therefore, it is an object of the present invention to lighten the workload of administrators in charge of a network printing system.

SUMMARY OF THE INVENTION

The aforementioned problems will be resolved by an information processing device according to the present invention that is connected to a plurality of printing devices and at least one terminal device via a network. The information processing device includes means for creating advice data based on print data related to the printing devices and command data related to print commands outputted from the terminal devices to the printing devices; and means for selecting criteria for creating advice data. The advice data creating means creates advice data based on criteria for creating advice data selected by the criteria selecting means.

This construction can reduce the workload on administrators, since the administrators can construct or modify the network according to advice produced by the advice data creating means. The print data related to printing devices specifically refers to a printing speed, a tray size, and a tray type. Commands outputted to printing devices (e.g., print this data on A4-size paper in that printing device) are referred to as command data rather than print data.

Further, an information processing device according to the present invention is connected to at least two printing device groups, each having a plurality of printing devices, and at least one terminal device via a network. The information processing device has means for calculating the load on each printing device group based on print data related to the printing devices and command data related to print commands outputted from the terminal devices; and means for creating advice data in order to reduce the load on at least one of the printing device groups.

A network printing system according to the present invention has an information processing device; a plurality of printing devices; at least one terminal device; and a network for connecting the information processing device, the printing devices, and the terminal devices. The information processing device includes means for creating advice data based on print data related to the printing devices and command data related to print commands outputted from the terminal devices to the printing devices; and means for selecting criteria for creating advice data. The advice data creating means creates advice data based on criteria for creating advice data selected by the criteria selecting means.

A computer program according to the present invention implements functions on an information processing device, including a function for acquiring print data related to printing devices; a function for acquiring command data related to print commands outputted from terminal devices to printing devices; and a function for creating advice data based on the print data and the command data according to criteria specified in log data.

Further, a computer program according to the present invention controls an information processing device connected to at least two printing device groups, each having a plurality of printing devices, and at least one terminal device via a network. The computer program implements functions on an information processing device, including a function for acquiring print data related to the printing devices; a function for acquiring command data related to print commands outputted from the terminal devices; a function for calculating load on each printing device group based on the print data and the command data; and a function for creating advice data to reduce load on at least one of the printing device groups.

These computer programs can be stored on a storage medium that is readable by a computer, such as a flexible disk, a magneto-optic disk, a CD-ROM, a hard disk, a ROM, or a RAM. The computer programs can be loaded into a computer from the storage medium and started when needed. The computer programs may also be loaded into the computer via a network.

BRIEF DESCRIPTION OF DRAWINGS

The aforementioned aspects and other features of the invention are explained in the following description, taken in connection with the accompanying drawing figures wherein:

FIG. 3 shows a database for printer specifications stored in an external storage device of the server;

FIG. 4 shows an Advice Setup window displayed on a monitor of the server;

FIG. 5 shows an Options window displayed on the monitor of the server;

FIG. 10 shows a Printer Layout Change Recommendation window that is displayed on the monitor of the server;

FIG. 11 shows an Advanced window displayed when the Advanced button shown in FIG. 10 is selected;

FIG. 12 shows a sample notification transmitted by e-mail or facsimile recommending a change in the layout of printers;

FIG. 14 shows a sample test page printed in the test printing process;

FIG. 21(a) shows sample device data acquired in S700 of FIG. 20;

FIG. 21(b) shows the status of printers after performing the second advice notification process;

FIG. 22 shows a Load Limit Input window displayed on the monitor of the server;

FIG. 25(a) shows sample device data acquired in S900 of FIG. 24;

FIG. 25(b) shows the status of printers after performing the fourth advice notification process;

FIG. 27(a) shows sample device data acquired in S1000 of FIG. 26;

FIG. 27(b) shows the status of printers after performing the fifth advice notification process;

FIG. 32(a) shows sample device data acquired in S1300 of FIG. 30;

FIG. 34 shows sample device data acquired in S1400 of FIG. 33;

FIG. 35 shows an Exception Period Setup window;

FIG. 36 shows a list of exception periods that have been set in the Exception Period Setup window of FIG. 35; and FIG. 37 is a flowchart showing a variation of the sixth advice notification process in FIG. 30.

DETAILED DESCRIPTION OF THE INVENTION

Next, a network printing system according to a preferred embodiment of the present invention will be described while referring to the accompanying drawings.

Figure 1:
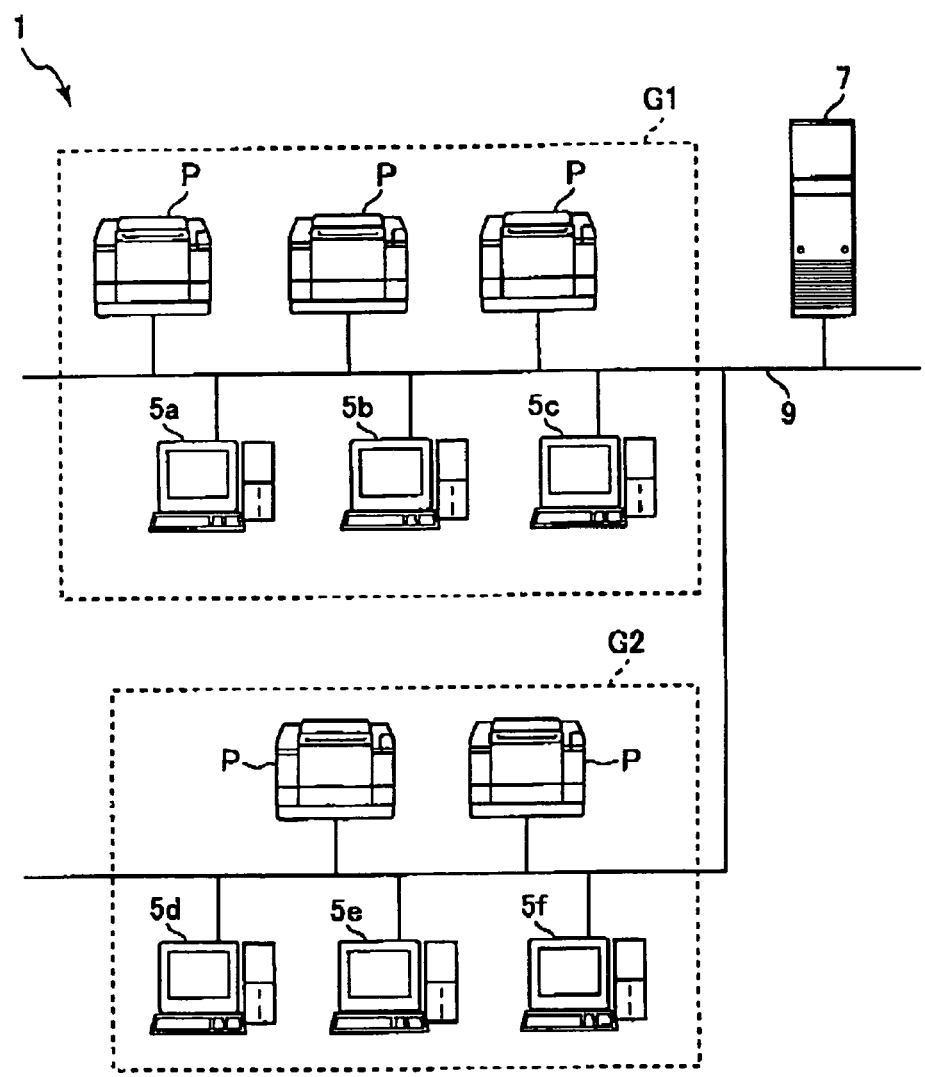
FIG. 1 is an explanatory diagram showing the general construction of a network printing system according to the present invention.

As shown in FIG. 1, a network printing system 1 according to the preferred embodiment of the present invention includes a plurality of printers P, a plurality of terminals 5a-5f, and a server 7 that are all connected by a cable 9. The terminals 5a-5c and a few of the printers P are included in a group G1, while the terminals 5d-5f and the remaining printers P are included in a group G2. Numerous printers P and numerous terminals 5 other than those shown in FIG. 1 are also connected to the network printing system 1. With this construction, a print command outputted from one of the terminals 5 is inputted into the printer P specified by the user via the server 7.

Figure 2:
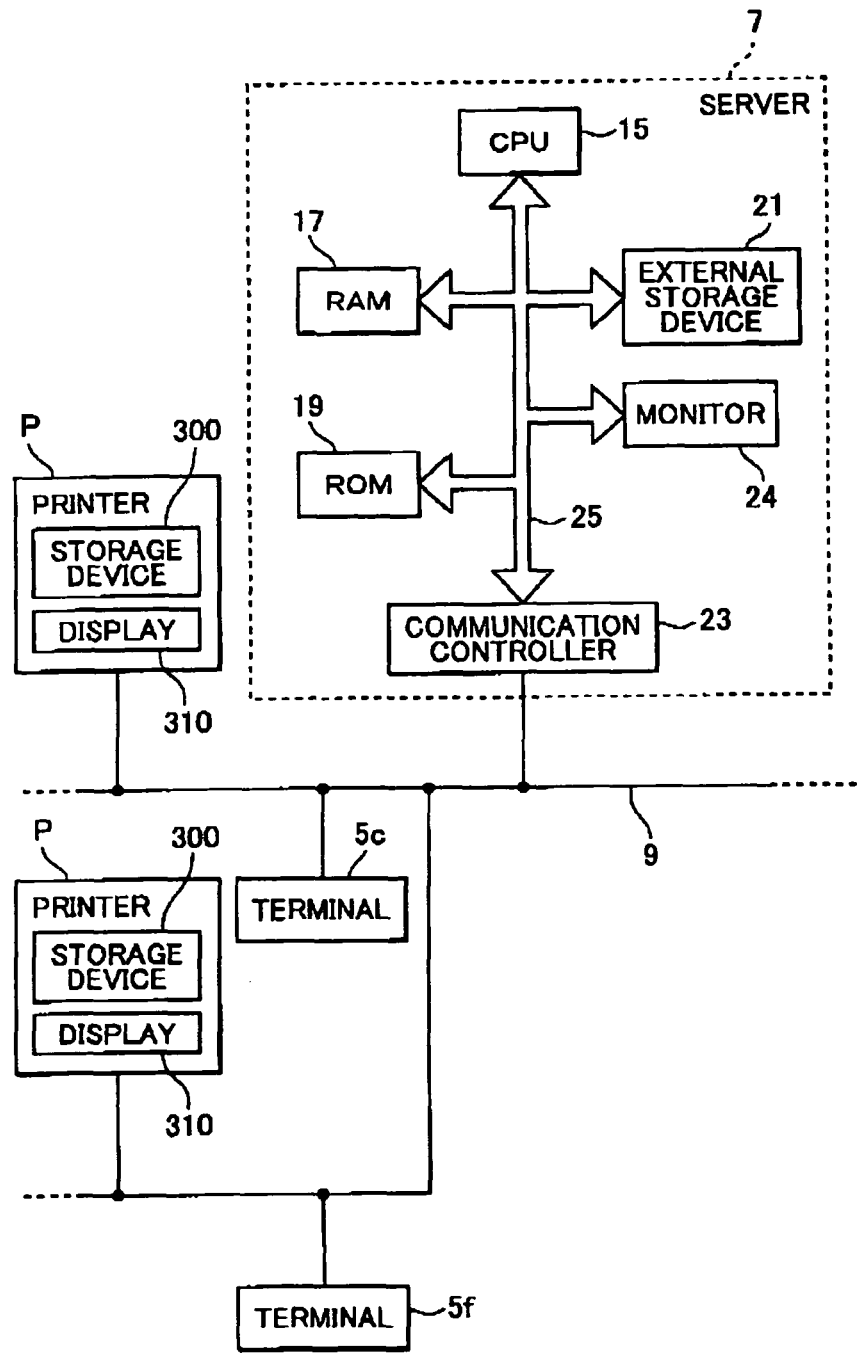
FIG. 2 is a block diagram showing the general construction of a server and printers in the network printing system of FIG. 1.

As shown in FIG. 2, each of the printers P includes a storage device 300 and a display 310, such as a liquid crystal panel. The server 7 primarily includes a CPU 15, a RAM 17, a ROM 19, an external storage device 21, a communication controller 23, a monitor 24, and a bus 25 linking these components. The ROM 19 stores a program for advice data notification processes described later, and other control programs. The CPU 15 executes the various programs stored in the ROM 19. The RAM 17 functions as a work area used during program execution. The communication controller 23 controls the exchange of data between the terminals 5 and the printers P. The external storage device 21 stores a database holding model names, and IP addresses for each printer P, as shown in FIG. 3. In addition to the model, IP address, gateway, and subnet shown in FIG. 3, this database stores such data as the printing speed, installation site, and resolution of each printer P. When a print command outputted from the terminal 5 is received into the specified printer P via the server 7, the external storage device 21 of the server 7 stores data in the print command, such as the output source, output destination, output date and time, number of pages to be printed, and amount of toner consumption. Various user interface windows are displayed on the monitor 24. Through these interface windows, an administrator can configure various settings.

Next, first through eighth advice notification processes according to the preferred embodiment will be described. These advice notification processes issue notifications recommending changes in the layout of the printers P based on advice settings configured by the administrator. A description of these processes follows, beginning from the first advice notification process.

First, the administrator of the network printing system 1 displays an Advice Setup window shown in FIG. 4 on the monitor 24 of the server 7 and checks the "Enable Layout Advice Function" box. Next, the administrator clicks the "Options" button to display the Options window shown in FIG. 5. In this window, the administrator selects "Equalize Load," "Reduce Costs," or "Optimize Usage Locations" as the "Advice Criteria." If "Equalize Load" is selected, the administrator must further select from one of "Equalize Printing Time," "Equalize Paper Loading Frequency," and "Equalize Toner Replacement Frequency." The CPU 15 executes the first advice notification process when "Equalize Printing Time" under "Equalize Load" has been selected, as shown in FIG. 5.

Figure 6:
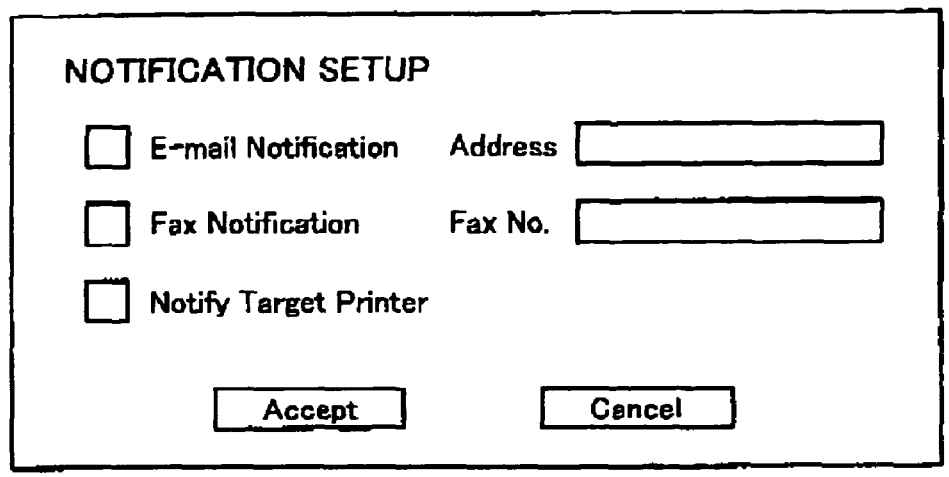
FIG. 6 shows a Notification Setup window displayed on the monitor of the server.

Next, the administrator clicks on the "Notification Setup" button shown in FIG. 4 to display a Notification Setup window shown in FIG. 6. In this window, the administrator sets a desired notification destination. After returning again to the Advice Setup window of FIG. 4, the administrator indicates a schedule for issuing advice. Here, the administrator can execute the advice notification process immediately or can indicate desired dates and times for executing the process on a regular basis.

Next, the first advice notification process will be described in detail with reference to the flowchart in FIG. 7. The first advice notification process begins at the timing based on the settings under "Advice Notification Schedule" in the Advice Setup window (FIG. 4). In S100 at the beginning of the process shown in FIG. 7, the CPU 15 acquires device data for each printer P from the external storage device 21. Device data includes command data and print data. In this embodiment, the CPU 15 acquires the average number of printed pages per day (pages/day) as the command data and the printing speed (ppm) as the print data. Table 1 shows an example of acquired device data. Here, ppm indicates the number of pages per minute that are printed.

TABLE 1

| ID No. | No. of printed pages (pages/day) | Printing speed (ppm) |
|---|---|---|
| 1 | 100 | 12 |
| 2 | 50 | 14 |
| 3 | 100 | 16 |
| 4 | 120 | 14 |
| 5 | 80 | 18 |

In this embodiment, there are five printers P for which device data has been acquired (number of printers=5). These printers P have been arbitrarily assigned the numbers 1-5.

In S105 the CPU 15 creates a List A in which the printers P have been sorted according to number of printed pages, beginning from the largest number. Table 2 shows List A for this example.

TABLE 2

| ID No. | No. of printed pages (pages/day) |
|---|---|
| 4 | 120 |
| 1 | 100 |
| 3 | 100 |
| 5 | 80 |
| 2 | 50 |

In S110 the CPU 15 creates a List B in which the printers P have been sorted according to printing speed, beginning from the fastest. Table 3 shows List B for this example.

TABLE 3

| ID No. | No. of printed pages (pages/day) |
|---|---|
| 5 | 18 |
| 3 | 16 |
| 2 | 14 |
| 4 | 14 |
| 1 | 12 |

In S115 the CPU 15 initializes a counter variable i to zero. In S120 the CPU 15 increments the counter variable i by 1. In S125 the CPU 15 determines whether the counter variable i is greater than the number of printers (5 in the present embodiment). If the counter variable i is not greater than the number of printers (S125: NO), then the CPU 15 advances to S130. However, if the counter variable i is greater than the number of printers (S125: YES), then the CPU 15 advances to S140.

In this embodiment, since i=1 and the number of printers=5 at this time, the result of the determination is NO (S125: NO), and the CPU 15 advances to S130. In S130 the CPU 15 determines whether the $i^{th}$ printer P (Printer i) can be placed at the same position in List A and List B. If Printer i cannot be placed at the same position (S130; NO), then the CPU 15 returns to S120. However, if Printer i can be placed at the same position in both lists (S130: YES), then the CPU 15 advances to S135.

Since i=1 in the current stage, Printer 1 cannot be placed at the same position in both Lists A and B (S130; NO). Therefore, the CPU 15 returns to S120 and increments i to 2. Since Printer 2 cannot be placed at the same position in both Lists A and B (S130: NO), the CPU 15 returns to S120 and increments i to 3 While at a glance it appears that Printer 3 cannot be placed in the same position in both Lists A and B, Printers 1 and 3 are interchangeable at the second or third positions in Table 2 because the number of printed pages for both Printers 1 and 3 is 100. In Table 3, on the other hand, Printer 3 is in the second position from the top. Accordingly, by switching the position of Printer 3 to the second position in List A, Printer 3 can be placed in the second position from the top in both Lists A and B.

Accordingly, the CPU 15 determines YES in S130 (S130: YES) and advances to S135. While only the order of List A shown in Table 2 was changed, a YES determination can also be made if a printer is at the same position in both Lists A and B after reordering interchangeable printers in both lists.

In S135 the CPU 15 updates both Lists A and B by deleting Printer i, Printer 3 in the present embodiment, from Lists A and B. Tables 4 and 5 show the updated Lists A and B, respectively.

TABLE 4

| ID No. | No. of printed pages |
|---|---|
| 4 | 120 |

TABLE 4-continued

| ID No. | No. of printed pages |
| --- | --- |
| 1 | 100 |
| 5 | 80 |
| 2 | 50 |

TABLE 5

| ID No. | Printing speed |
| --- | --- |
| 5 | 18 |
| 2 | 14 |
| 4 | 14 |
| 1 | 12 |

After completing the process in S135, the CPU 15 returns to S120 and repeats the process in S120-S135 for Printers 4 and 5. Since neither Printer 4 or 5 can be deleted from Lists A and B in the present embodiment, the CPU 15 makes a YES determination in S125 when i=6 (S125: YES) and advances to S140. The length of the Lists A and B at this time will be referred to as a list length. Lists A and B have the original list length if no printers P were deleted in the process described above and a list length of 0 if all printers P were deleted. In the present embodiment, the list length is 4.

In S140 the CPU 15 initializes a counter variable j to 0. In S145 the CPU 15 increments the counter variable j by 1. In S150 the CPU 15 determines whether the counter variable j is greater than the list length. If the counter variable j is greater than the list length (S150: YES), then the process ends. However, if the counter variable j is not greater than the list length (S150: NO), then the CPU 15 advances to S155. Since j=1 at this time and list length=4 (S150: NO), the CPU 15 advances to S155. In S155 the CPU 15 creates advice data recommending an exchange in layout positions between the printer P in the $j^{th}$ position from the top of List A (Table 4) and the printer P in the $j^{th}$ position from the top of List B (Table 5). The CPU 15 transmits this advice data in a notification process of S160 and returns to S145. The notification process executed in S160 will be described in greater detail below.

The process of S145-S160 is repeated until j>list length. During this time, four types of advice are issued, including "exchange Printers 4 and 5," "exchange Printers 1 and 2," "exchange Printers 5 and 4," and "exchange Printers 2 and 1." If essentially the same advice is issued a plurality of times, such as "exchange Printers 4 and 5" and "exchange Printers 5 and 4," this exchange is performed only once to avoid canceling out one exchange with the other. Hence, in the present embodiment, the advice issued will recommend to "exchange Printers 4 and 5" and "exchange Printers 1 and 2." Table 6 shows the result of changing the layout positions of the printers P according to this advice.

TABLE 6

| ID No. | No. of printed pages | Printing speed |
| --- | --- | --- |
| 1 | 50 | 12 |
| 2 | 100 | 14 |
| 3 | 100 | 16 |
| 4 | 80 | 14 |
| 5 | 120 | 18 |

As can be seen in Table 6, the first advice notification process has eliminated the uneven distribution in the amount of load placed on the printers P by assigning fast printers P to locations having a high number of printed pages.

With the first advice notification process, it is possible to avoid sending a high concentration of print jobs to printers with a slow printing speed simply by changing the layout of the printers P according to advice obtained in the process. Accordingly, the user is not forced to wait unnecessarily, and malfunctions of the printers P can be prevented. Further, the burden on the administrator can be greatly reduced since the administrator need only change the layout of the printers P according to the advice obtained in the process.

Figure 8:
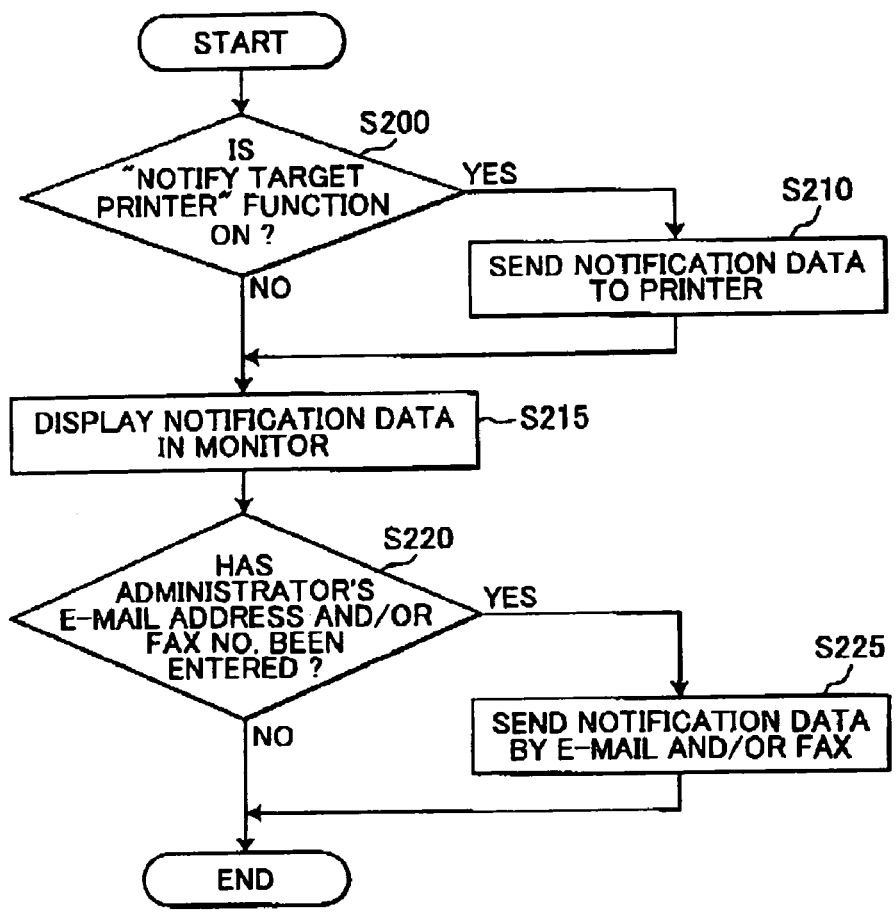
FIG. 8 is a flowchart of a notification process.

Next, the notification process executed in S160 will be described with reference to the flowchart in FIG. 8.

Figure 9:
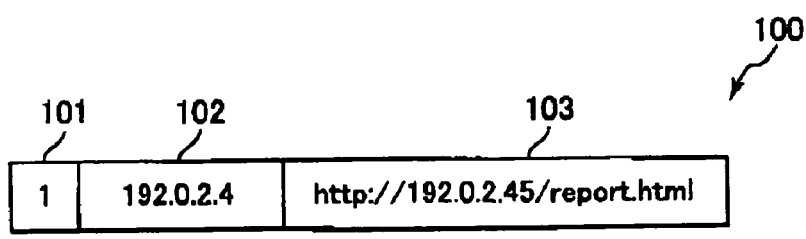
FIG. 9 shows notification data transmitted from the server.

At the beginning of the notification process in S200, the CPU 15 determines whether a "Notify Target Printer" function is on. The "Notify Target Printer" function is turned on by checking the box next to "Notify Target Printer" in the Notification Setup window shown in FIG. 6. If the function is not on (S200: NO), then the CPU 15 advances to S215. However, if the function is on (S200: YES), then in S210 the CPU 15 transmits the notification data created in S155 to the printers P targeted for a layout change and subsequently advances to S215. FIG. 9 shows an example of the notification data transmitted in S210. A notification data record 100 includes a flag 101 indicating whether to exchange the printer P, an IP address 102 of the printer P with which the exchange will be made, and a URL 103 for accessing detailed data stored on the server 7. The detailed data is HTML data identical to what will be displayed in an HTML advice window (see FIG. 10) on the monitor 24 of the server 7, as will be described later. The transmitted notification data record 100 is stored in the storage device 300 of the printer P.

In S215 the CPU 15 displays an HTML advice window, such as that shown in FIG. 10, on the monitor 24 of the server 7. In this way, the administrator can easily confirm whether printers P should be exchanged and can view the details of such exchanges. By clicking on an Advanced button in the HTML advice window to display an Advanced window shown in FIG. 11, the administrator can easily view detailed information on the printers P that are targets of a layout change. Here, data such as the model names and IP addresses of the target printers P are acquired from the database shown in FIG. 3.

In S220 the CPU 15 determines whether an "E-mail Notification and/or Fax Notification" function are on. The "E-mail Notification and/or Fax Notification" function is turned on by checking the box next to "E-mail Notification and/or Fax Notification" and entering a desired e-mail address and/or fax number in the corresponding space. If either the "E-mail Notification" or "Fax Notification" function is not on (S220: NO), then the process ends. However, if one or both of the functions is on (S220: YES), then the CPU 15 advances to S225. In S225 the CPU 15 transmits a notification by e-mail and/or fax to the specified e-mail address and/or fax number. The notification, such as that shown in FIG. 12, recommends a change in the printer layout. Subsequently, the CPU 15 ends the process.

Hence, advice data created according to the preferred embodiment can be transmitted to a desired notification destination, enabling the administrator to learn whether a layout change is necessary and the details of such a change, without being present in front of the server 7. Further, the generated advice will not go unnoticed by the administrator because the advice is always displayed on the monitor 24 of the server 7, regardless of whether the "Notify Target Printer" function or the "E-mail Notification and/or Fax Notification" functions are turned on or off.

Next, first through third processes will be described. These processes print or transmit advice data based on the notification data record 100 transmitted to the printer P in S210 of the notification process. Executed by each printer P, the processes output an advice display based on the notification data record 100, provided that the notification data record 100 exists.

Figure 13:
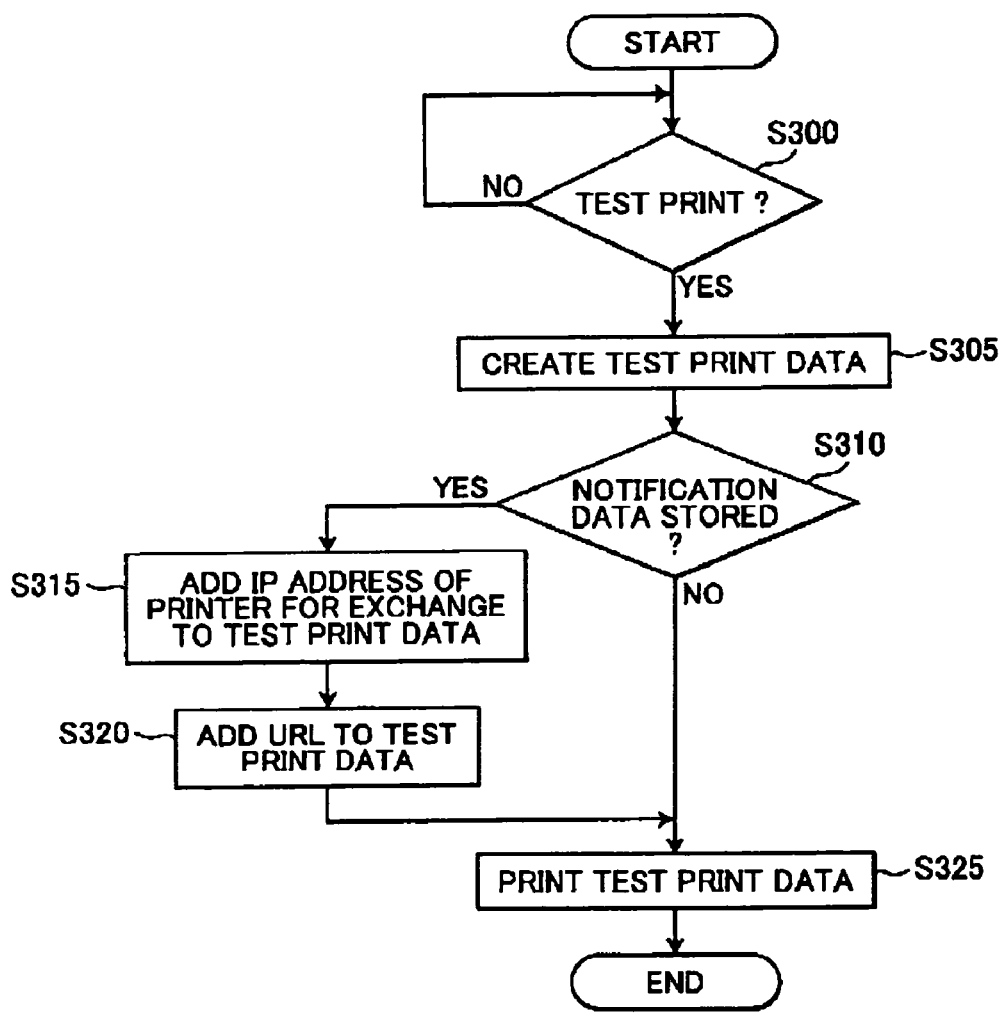
FIG. 13 is a flowchart of a test printing process executed by a printer.

First, the first test printing process according to the present embodiment will be described with reference to the flowchart in FIG. 13.

In S300 the printer P determines whether a test print command has been received from the user. The user inputs this test print command via a panel on the printer P, for example. If a test print command has not been issued (S300: NO), then the printer P waits until a command is received. If a test print command has been issued (S300: YES), then in S305 the printer P creates test print data. In S310 the printer P determines whether the notification data record 100 from the server 7 is stored in memory. If the notification data record 100 is stored in memory (S310; YES), then in S315 the printer P reads the IP address 102 from the notification data record 100 and adds the IP address to the test print data. In S320 the printer P reads the URL 103 from the notification data record 100 and adds the URL 103 to the test print data together with a standard phrase such as "The load on this printer is high. Recommend switching with _____ printer." In S325 the printer P prints this test print data and ends the process. FIG. 14 shows a sample print output from this process. As shown in FIG. 14, the print output includes an advice section A with a recommendation for switching the printer P. Accordingly, the user can be notified that it is advisable to switch printers P when performing a test print on the printer P. However, if the printer P determines in S310 that the notification data record 100 is not saved in memory (S310: NO), then the printer P advances directly to S325 and performs a normal test print, which does not include the advice section A.

In this way, the first test printing process can inform the user of advice created in the advice notification process when the user issues a test print command.

Figure 15:
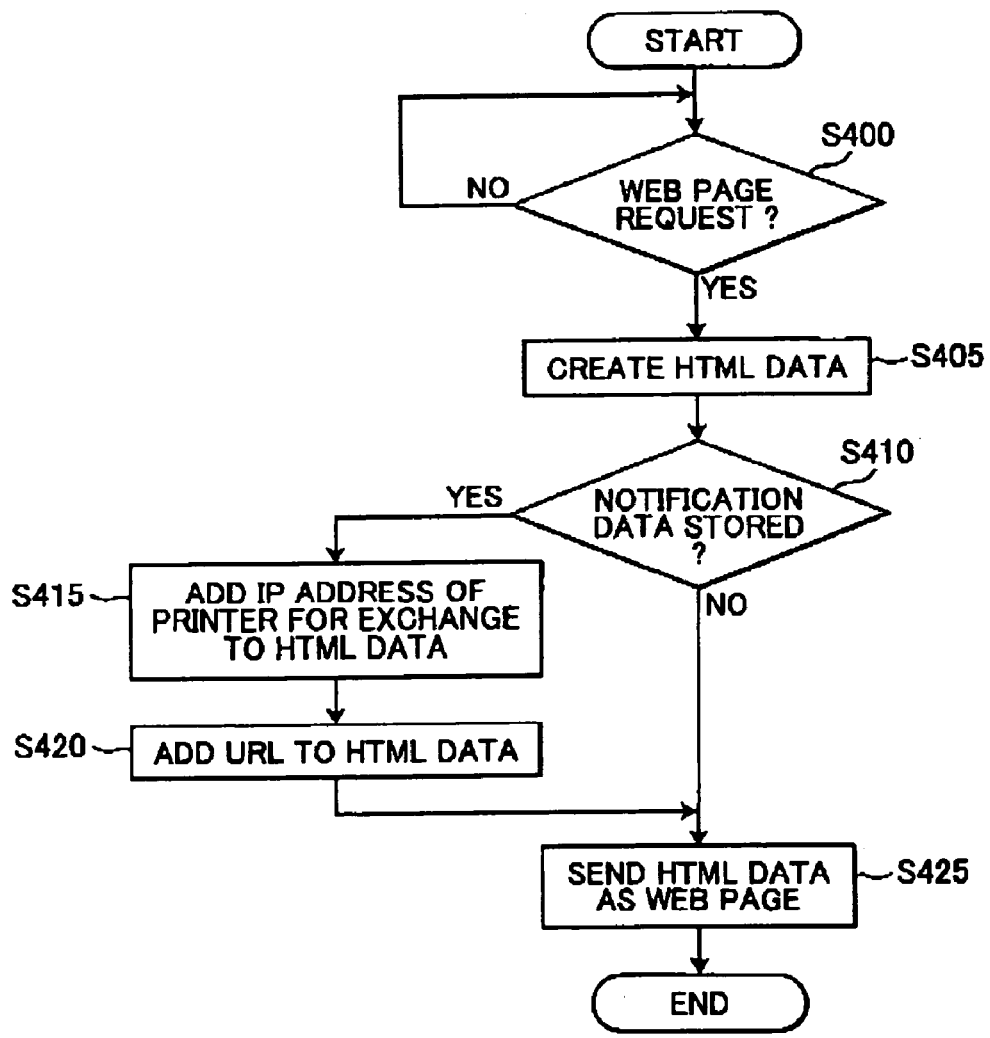
FIG. 15 is a flowchart of an HTML data transmission process executed by a printer.

Next, a second transmitting process according to the preferred embodiment will be described with reference to the flowchart in FIG. 15. Each of the printers P in the preferred embodiment possesses a corresponding Web page. Using a Web browser on the terminal 5, the user can access this Web page to view the status of the printer P.

In S400 of the second transmitting process, the printer P determines whether the terminal 5 has attempted to access the Web page. If no attempt to access the Web page has been made (S400: NO), then the printer P waits until an access attempt has been made. When an attempt to access the Web page is made (S400: YES), then in S405 the printer P creates HTML data to reply to the terminal 5.

Figure 16:
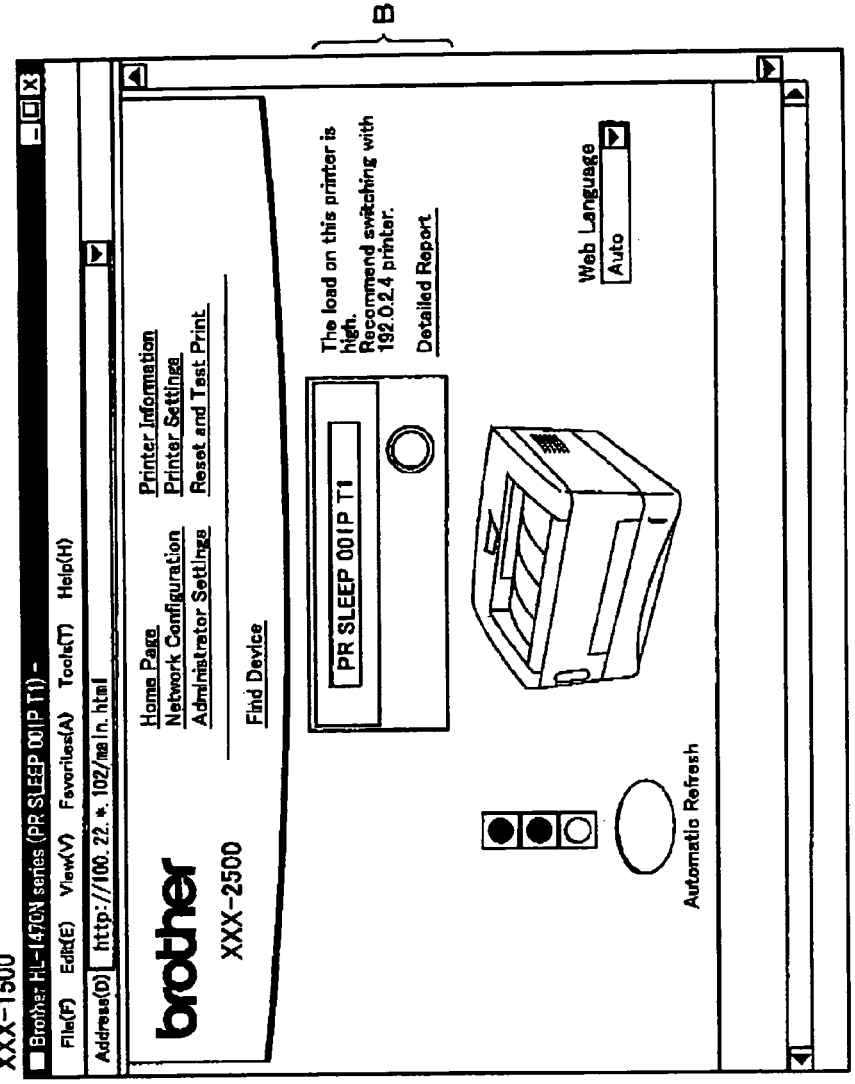
FIG. 16 shows a status page for a printer displayed in a browser of a terminal.

In S410 the printer P determines whether the notification data record 100 from the server 7 is stored in memory. If the notification data record 100 is stored in memory (S410: YES), then in S415 the printer P reads the IP address 102 from the notification data record 100 and adds the IP address 102 to the HTML data created in S405. In S420 the printer P reads the URL 103 from the notification data record 100 and adds the URL 103 to the HTML data together with a standard phrase such as "The load on this printer is high. Recommend switching to _____ printer." In S425 the printer P transmits this HTML data to the terminal 5 that accessed the Web page and ends the process. As a result, the browser window on the terminal 5 displays a Web page such as that shown in FIG. 16, including an advice section B that recommends switching the printer P.

In this way, the second transmitting process can inform the user that it is advisable to switch to another printer P when the user has requested the printing status of a prescribed printer P.

However, if the printer P determines in S410 that the notification data record 100 is not stored in memory (S410: NO), then the printer P advances directly to S425, transmits the HTML data, and ends the process. In this case, a normal Web page is displayed without the advice section B.

Figure 17:
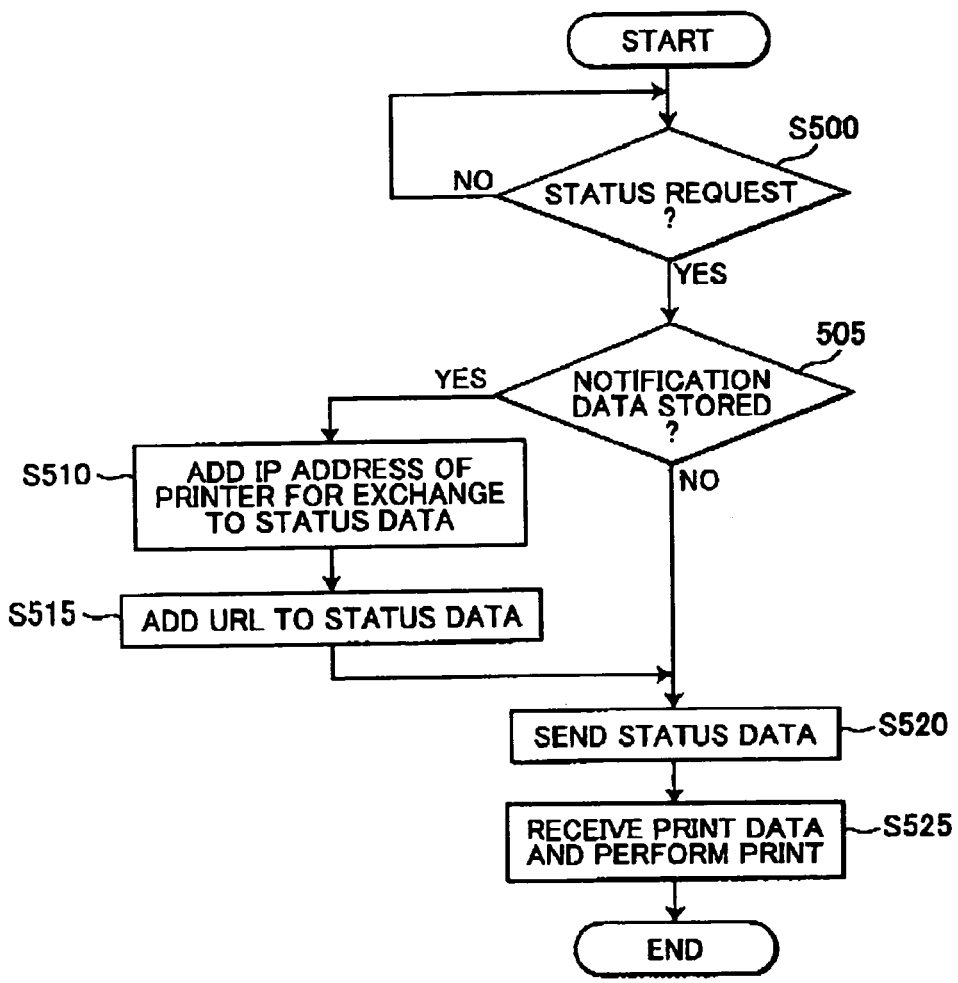
FIG. 17 is a flowchart of a printing process executed by a printer.

Next, a third printing/transmitting process according to the preferred embodiment will be described with reference to the flowchart in FIG. 17. In S500 the printer P determines whether a status request has been received from the terminal 5 prior to a printing operation. If a status request has not been received (S500. NO), then the printer P waits until a request has been received. If a status request has been received (S500: YES), then in S505 the printer P determines whether the notification data record 100 from the server 7 is stored in memory. If the notification data record 100 is not stored in memory (S505: NO), then the printer P advances to S520. However, if the notification data record 100 is stored in memory (S505: YES), then in S510 the printer p reads the IP address 102 from the notification data record 100 and adds the IP address 102 to the status data. In S515 the printer P reads the URL 103 from the notification data record 100 and adds the URL 103 to the status data. In S520 the printer P transmits the status data to the terminal 5 that had requested the status. In S525 the printer P receives print data transmitted from the terminal 5, performs the printing operation, and ends the process.

Figure 18:
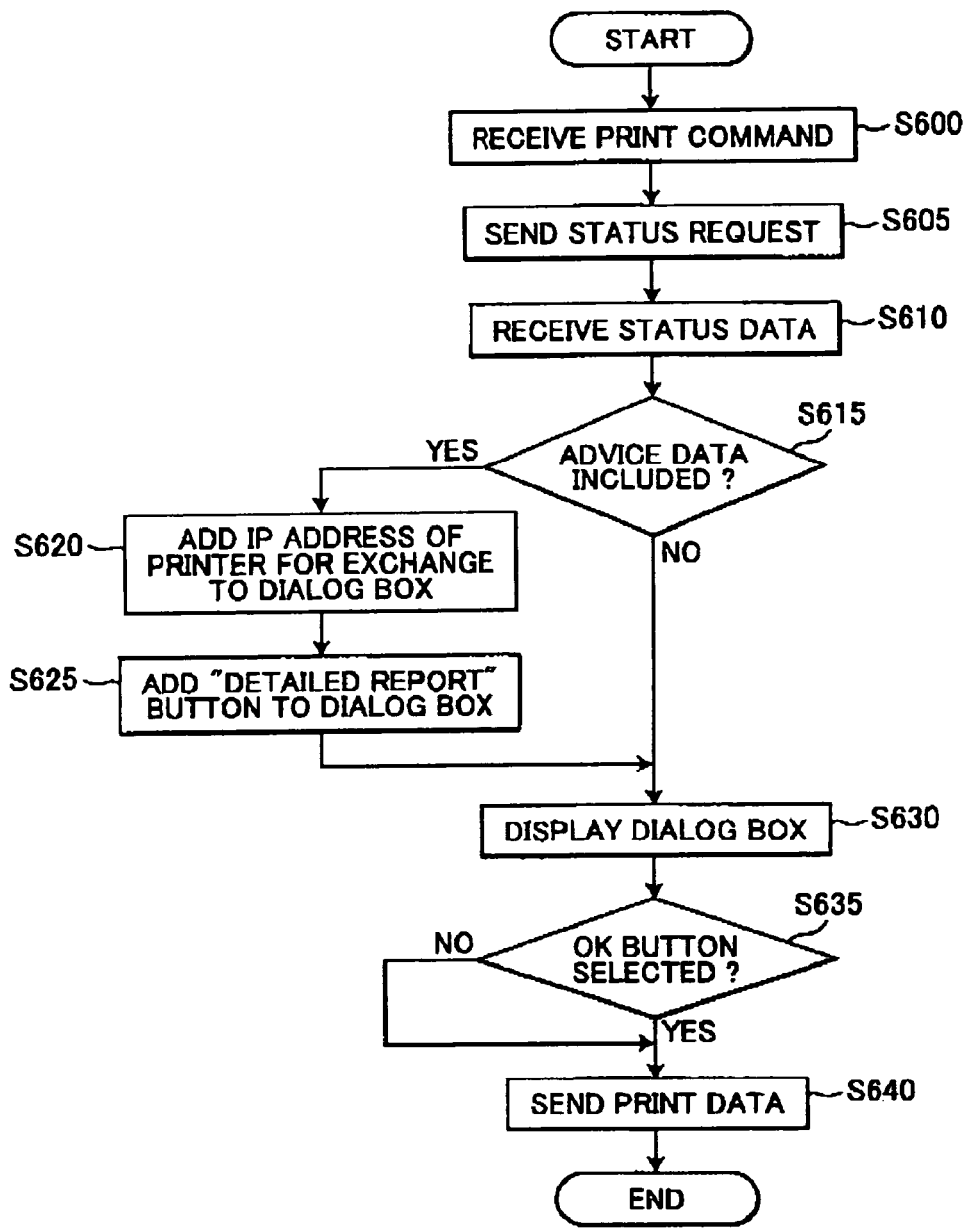
FIG. 18 is a flowchart of a process to display the status of a printer executed by a terminal.

Next, a dialog box display process executed by the terminal 5 will be described with reference to the flowchart in FIG. 18. This dialog box display process is a companion to the third printing/transmitting process described above and begins when the user inputs a print command into the terminal 5.

Figure 19:
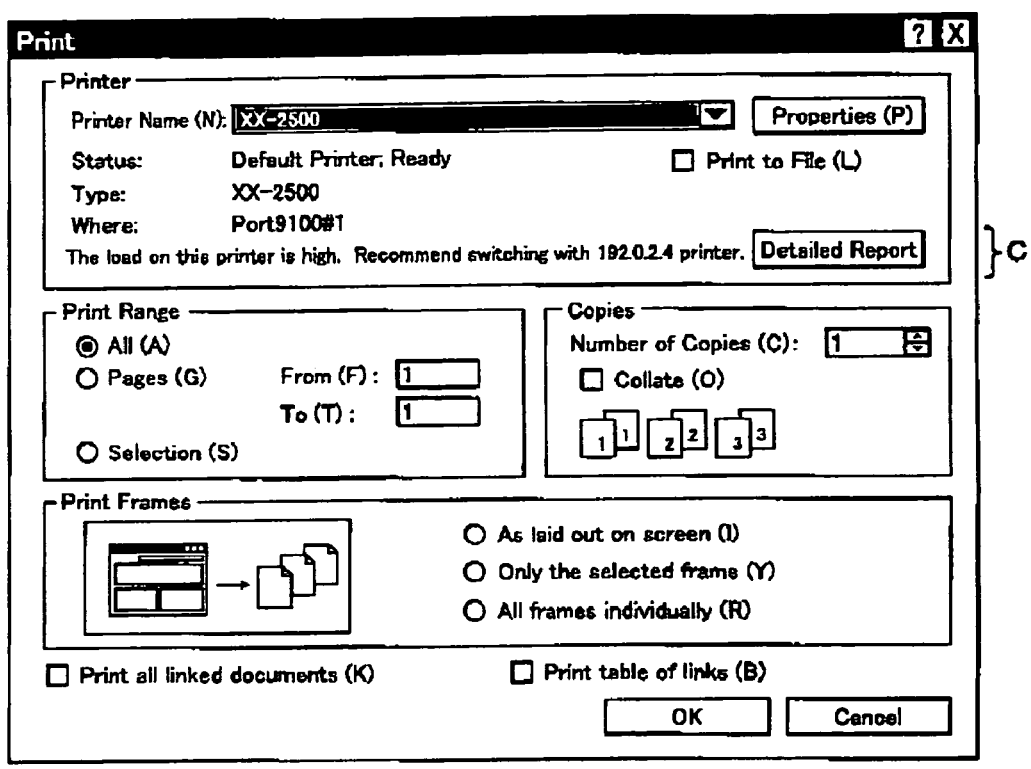
FIG. 19 shows a dialog box displayed in the process to display the status of a printer that includes advice on selecting a printer.

At the beginning of the process in S600, the terminal 5 receives a print command. In S605 the terminal 5 requests status data from the printer P. Upon receiving the request, the printer P returns the status data in S520 of FIG. 17, and the terminal 5 receives the status data from the printer P in S610. In S615 the terminal 5 determines whether the status data received in S610 includes advice data. Advice data in the preferred embodiment includes the IP address 102 added to the status data in S510 and S515 in FIG. 15. If advice data is included (S615: YES), then in S620 the terminal 5 adds the IP address 102 to a Status Display dialog box. In S625 the terminal 5 adds a "Detailed Report" button linked to the URL 103 in the Status Display dialog box. In S630 the terminal 5 displays the Status Display dialog box on the display. FIG. 19 shows a sample dialog box displayed in S630. Here, a message recommending a printer layout change is displayed as advice data in an advice section C and includes the IP address of the printer P suggested for the exchange. Accordingly, the user can be informed when an exchange of printers is recommended.

However, if the terminal 5 determines in S615 that the status data does not include advice data (S615: NO), then the terminal 5 advances directly to S630 and displays a normal Status Display dialog box without advice data.

Subsequently, the terminal 5 advances to S635. If the user selects an "OK" button in the dialog box (S635: YES), then in S640 the terminal 5 transmits print data to the printer P and ends the process. However, if the user selects a "Cancel" button (S635: NO), then the terminal 5 ends the process without transmitting the print data.

In this way, when the user executes a printing operation using the printer P, the third printing/transmitting process can recommend the user to switch to another printer P.

Figure 20:
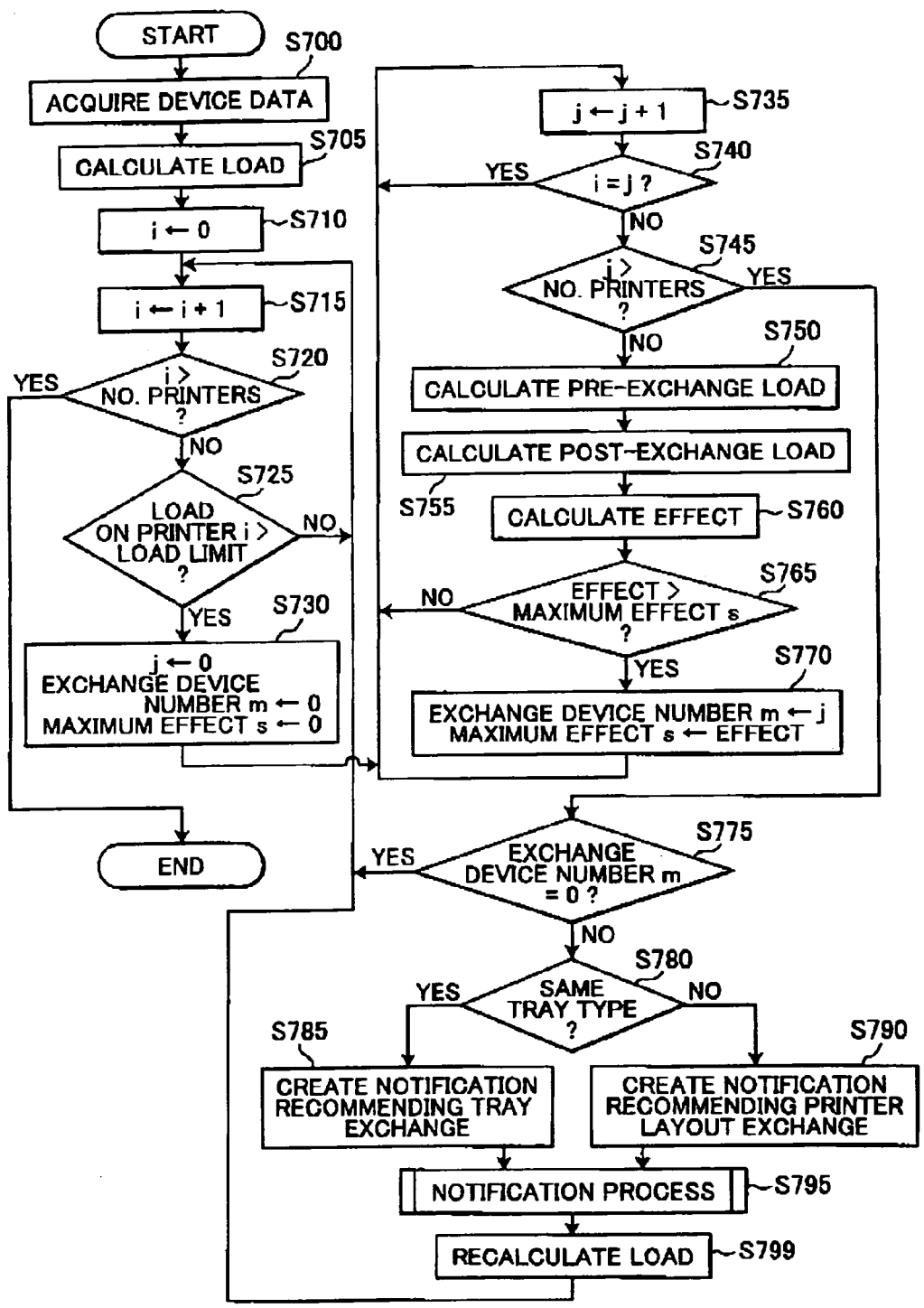
FIG. 20 is a flowchart of a second advice notification process executed by the server.

Next, a second advice notification process according to the preferred embodiment of the present invention will be described. The second advice notification process is executed by the CPU 15 when "Equalize Paper Loading Frequency" has been selected under "Equalize Load" in the Options window (see FIG. 5) and provides advice on switching paper supply trays or the layout of the printers P based on device data. As with the first advice notification process, the current process begins according to the schedule set by the administrator in the Advice Setup window (see FIG. 4). The second advice notification process will be described next with reference to the flowchart in FIG. 20.

At the beginning of the process in S700, the CPU 15 acquires device data concerning each of the printers P from the external storage device 21. FIG. 21(*a*) shows an example of acquired device data. In this embodiment, there are four printers P for which data has been acquired (number of printers=4). The printers P have been arbitrarily assigned the numbers 1-4. The device data includes command data and print data. As shown in FIG. 21(*a*), the CPU 15 acquires the total number of printed pages per day (pages/day) as the command data, and the tray size and tray type of the paper supply tray as the print data. Since the tray type indicates whether paper supply trays are compatible, paper supply trays can be interchangeably used in printers with the same tray type.

In S705 the CPU 15 calculates the load on each printer P. The load is obtained by dividing the total number of printed pages per day (pages/day) by tray size. The greater the load, the more frequently the user will be prompted to reload paper in the printer P. In S710 the CPU 15 initializes a counter variable i to 0. In S715 the CPU 15 increments the counter variable i by 1. In S720 the CPU 15 determines whether i is greater than the number of printers. If i is greater (S720: YES), then the process has been completed for all four printers P, and the CPU 15 ends the process. Since i=1 at this time and the number of printers is 4 (S720: NO), the CPU 15 advances to S725. In S725 the CPU 15 determines whether the load on the it printer P (Printer i) exceeds the load limit. In the preferred embodiment, the load limit is a value primarily set by the administrator that indicates the maximum load acceptable for the printers P. The load limit can be inputted using a Load Limit Input window shown in FIG. 22. In this embodiment, the load limit has been set to 1.5. The Load Limit Input window is displayed by clicking on a "Load Limit Setup" button in the Options window (FIG. 5).

Since i is currently 1, the load on Printer 1 can be calculated from FIG. 21(*a*) as 150/250=0.6. Since 0.6 is smaller than the load limit 1.5 (S725: NO), the CPU 15 returns to S715. In S715 the CPU 15 increments i by 1. Since i=2 (S720: NO), the CPU 15 advances to S725. The load on Printer 2 is 200/100=2.0. Since 2.0 is greater than the load limit 1.5 (S725: YES), the CPU 15 advances to S730.

In S730 the CPU 15 initializes a counter variable j, an exchange device number m, and a maximum effect s to 0. The exchange device number m is a pointer indicating the printer P to be exchanged for Printer i. The maximum effect s indicates the degree of effect that can be expected from the exchange (that is, how much the load will be decreased). In S735 the CPU 15 increments the counter variable j by 1. In S740 the CPU 15 determines whether i is equal to j. If the two variables are equal (S740: YES), then the CPU 15 returns to S735. However, if i and j are not equal (S740: NO), then the CPU 15 advances to S745. Since i=2 is not equal to j=1 at this time (S740: NO), the CPU 15 advances to S745. In S745 the CPU 15 determines whether j is larger than the number of printers. If j is not larger than the number of printers (S745: NO), then the CPU 15 advances to S750. However, if j is larger than the number of printers (S745: YES), then the CPU 15 advances to S775. Since j=1 at this time and the number of printers is 4 so that j is not greater than the number of printers (S745: NO), the CPU 15 advances to S750. In S750 the CPU 15 calculates the pre-exchange load prior to exchanging Printer i with Printer j. The pre-exchange load is obtained by adding the load on Printer i to the load on Printer j. In S755 the CPU 15 calculates a post-exchange load. The post-exchange load is calculated by the expression (total number of printed pages for Printer i÷tray size of Printer j)+(total number of printed pages for Printer j÷tray size of Printer i).

Since i=2 and j=1 at this time, using the example shown in FIG. 21(*a*), the pre-exchange load is 0.6+2.0=2.6 and the post-exchange load is (150/100)+(200/250)=2.3. In S760 the CPU 15 calculates the "effect" of the exchange by subtracting the post-exchange load from the pre-exchange load. Since the pre-exchange load is 2.6 and the post-exchange load is 2.3 at this time, the effect is 2.6−2.3=0.3. In S765 the CPU 15 determines whether this effect is greater than the maximum effect s. If the calculated effect is not greater than the maximum effect s (S765: NO), then the CPU 15 returns to S735. However, if the effect is greater (S765: YES), then the CPU 15 advances to S770. Since the effect is 0.3 and the maximum effect s is 0 in this embodiment, the CPU 15 advances to S770. In S770 the CPU 15 sets the exchange device number m to j (1 in this embodiment) and the maximum effect s to the effect calculated in S760 (0.3 in this embodiment), and subsequently returns to S735.

Since the CPU 15 increments j to 2 after returning to S735 (S740: YES), the CPU 15 again returns to S735, incrementing j to 3. When j=3, the CPU 15 advances to S750 through S740 and S745 (S740, S745: NO). Since i=2 and j=3 at this time, the CPU 15 calculates the pre-exchange load to be 2.67 in S750 and the post-exchange load to be 2.33 in S755 based on the conditions shown in FIG. 21(*a*). In S760 the effect is calculated to be 0.33. Since this effect is greater than the maximum effect s of 0.30 (S765: YES), the CPU 15 advances to S770 and sets the exchange device number m to j=3 and the maximum effect s to 0.33.

After returning again to S735, the CPU 15 increments j to 4 and advances to S750 through S740 and S745 (S740, S745: NO). Since i=2 and j=4 at this time-, the CPU 15 calculates the pre-exchange load to be 3.25 in S750 and the post-exchange load to be 3.50 in S755 based on the conditions shown in FIG. 21(*a*). Accordingly, the effect is determined to be −0.25 in S760. Since this effect is not larger than the maximum effect s=0.33 (S765: NO), the CPU 15 returns to S735. After j is incremented to 5 in S735, the CPU 15 makes a YES determination in S745 (S745: YES) and advances to S775. In the process of S735-S770, the number of the printer P that obtains maximum effect when exchanged with Printer i is assigned to exchange device number m.

In S775 the CPU 15 determines whether exchange device number m=0. If exchange device number m=0 (S775: YES), then the process in S770 was not executed even once, indicating that the load on Printer i cannot be decreased by exchanging Printer i with another printer P. In such a case, the CPU 15 returns to S715 without advising the administrator to make an exchange.

However, if exchange device number m is not 0 (S775: NO), then in S780 the CPU 15 determines whether the tray type of Printer i is the same as the tray type of Printer m. If the tray types are the same (S780: YES), then the load can be decreased simply by exchanging trays. Accordingly, the CPU 15 advances to S785, creates advice recommending that the tray of Printer i be exchanged with the tray of Printer m, and advances to S795. At this time, the tray types are different, since i=2 and m=3, and the tray types for Printers 2 and 3 are B and A, respectively. When the tray types are different as in this case (S780: NO), the CPU 15 advances to S790, creates advice recommending that the layout positions of Printers i and m be exchanged, and advances to S795.

Figure 7:
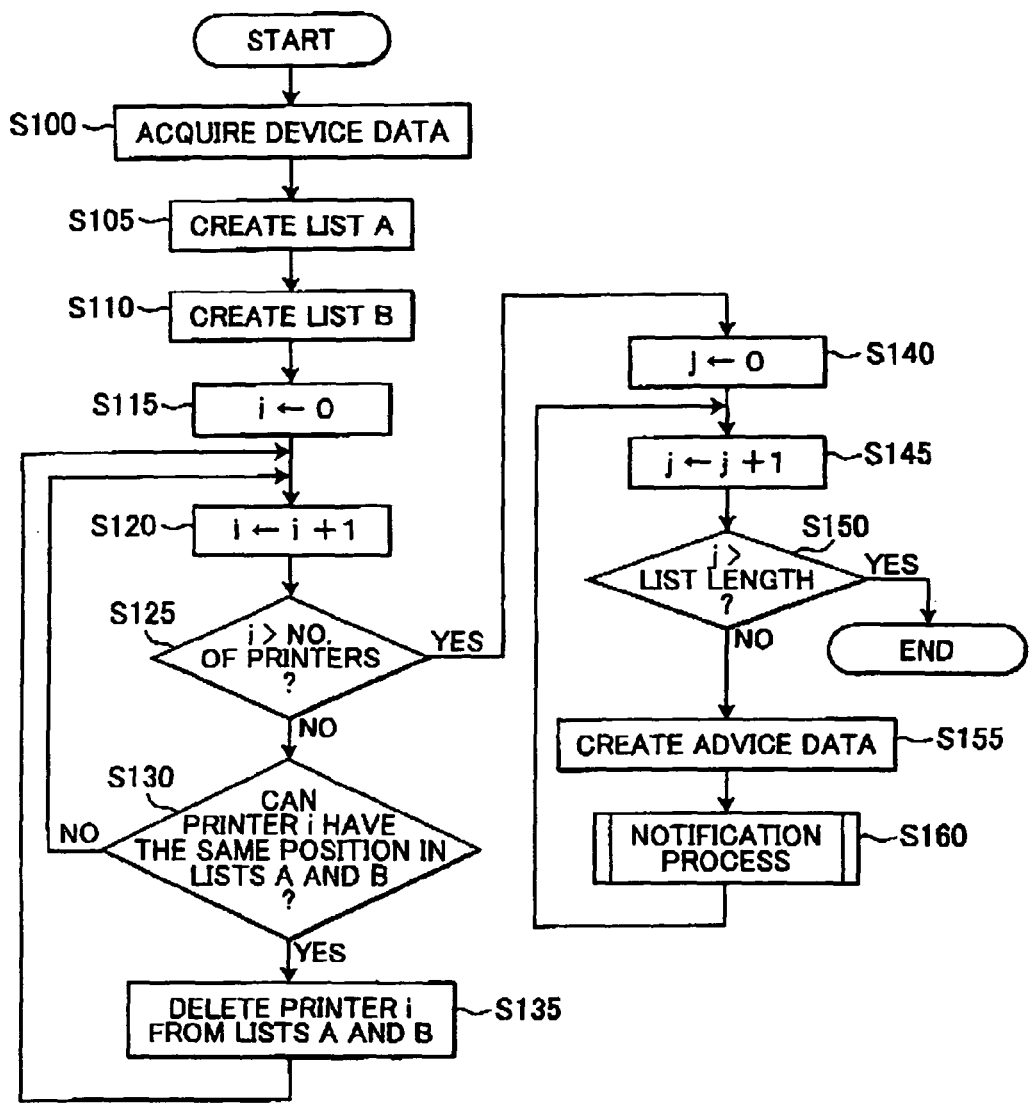
FIG. 7 is a flowchart for a first advice notification process executed by the server.

In S795 the CPU 15 performs the same notification process (FIG. 8) that was executed in S160 of FIG. 7 in order to transmit or display details of the advice created in either S785 or S790. In S799 the CPU 15 recalculates the load on each of the printers P based on exchanging the trays or printers P according to this advice, and returns to S715.

FIG. 21(b) shows the results after completing the process described above. Table 7 shows changes in the load on Printers 1-4.

TABLE 7

|  | Before exchange | | | After exchange | | |
| --- | --- | --- | --- | --- | --- | --- |
|  | Pages | Tray size | Load | Pages | Tray size | Load |
| Printer 1 | 150 | 250 | 0.60 | 150 | 250 | 0.60 |
| Printer 2 | 200 | 100 | 2.00 | 100 | 100 | 1.00 |
| Printer 3 | 100 | 150 | 0.67 | 200 | 150 | 1.33 |
| Printer 4 | 250 | 200 | 1.25 | 250 | 200 | 1.25 |
| Total |  |  | 4.52 |  |  | 4.18 |

From Table 7, it is apparent that the total load on the printers P after executing this process is less than the load prior to executing the process. The second advice notification process of this embodiment enables most printing to be performed using printers P having a large tray capacity. Therefore, a more efficient network printing system 1 can be constructed by correcting uneven-distributed loads on particular printers P. Further, since only the trays need to be exchanged between printers P having the same tray type, the amount of labor required for moving printers P can be reduced.

Figure 23:
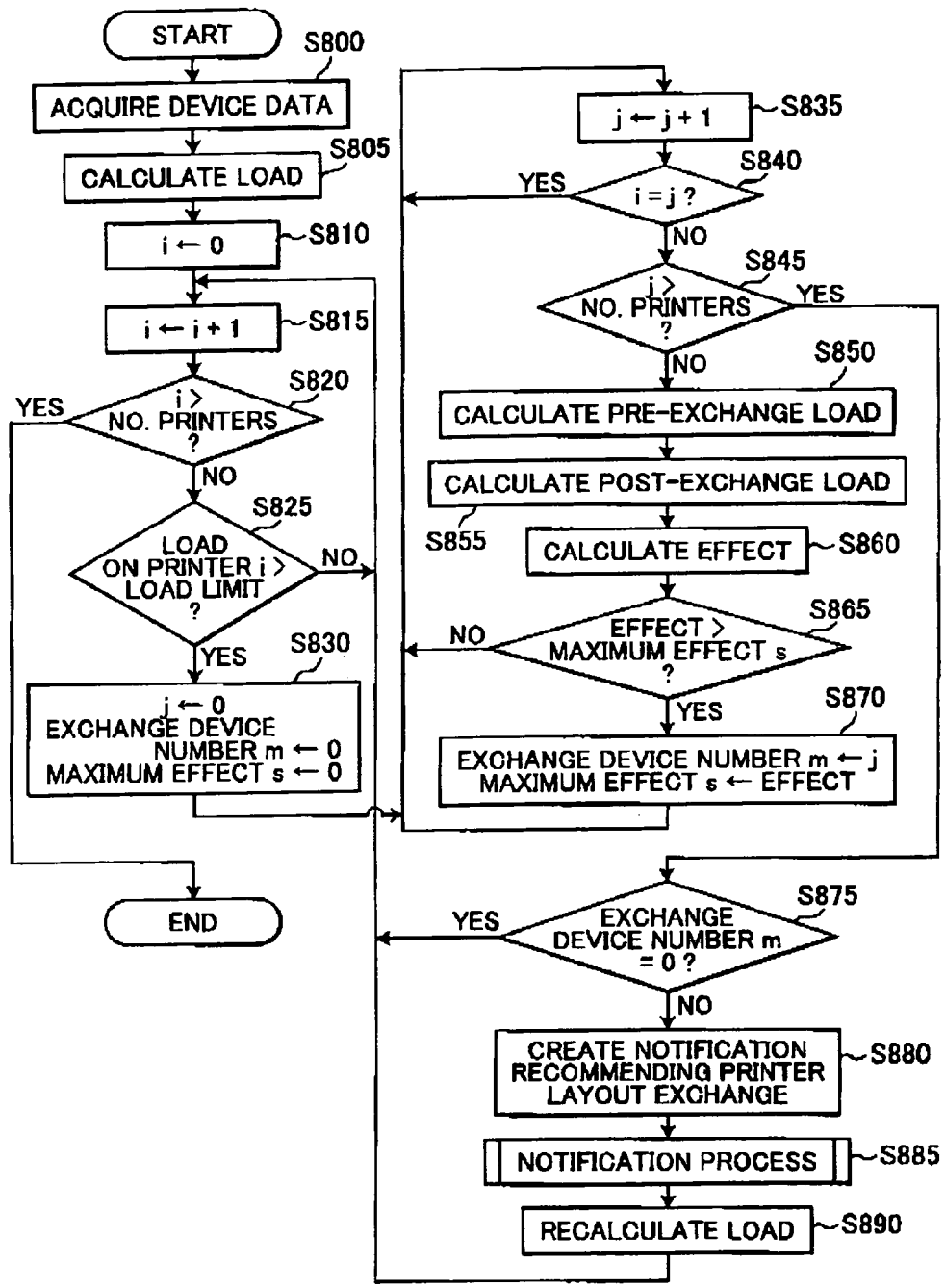
FIG. 23 is a flowchart showing a third advice notification process executed by the server.

Next, a third advice notification process according to the preferred embodiment will be described. The third advice notification process is executed when "Equalize Toner Replacement Frequency" is selected under "Equalize Load" in the "Advice Criteria" section of the Options window (FIG. 5). The amount of toner consumed during printing differs according to the print commands. In general, a large amount of toner is consumed when the printing job includes many images, while a smaller amount of toner is sufficient for text-only printing. Accordingly, the third advice notification process offers advice on exchanging the layout positions of printers P based on the toner capacity in those printers P. As in the first and second advice notification processes, the third advice notification process begins according to the specified advice notification schedule. This process will be described next with reference to the flowchart in FIG. 23.

At the beginning of the process in S900, the CPU 15 acquires device data for each of the printers P from the external storage device 21. This device data includes command data and print data. In this embodiment, the CPU 15 acquires values for toner consumption per day as the command data and toner capacity of the printers P as print data. In S805 the CPU 15 calculates the load on each printer P. Load is obtained by dividing toner consumption by toner capacity. The higher the value, the more frequently the user is prompted to replace toner. Table 8 shows an example of the device data acquired in S800 and the loads calculated in S805.

TABLE 8

|  | Before exchange | | | After exchange | | |
| --- | --- | --- | --- | --- | --- | --- |
|  | Pages | Tray size | Load | Pages | Tray size | Load |
| Printer 1 | 150 | 250 | 0.60 | 150 | 250 | 0.60 |
| Printer 2 | 200 | 100 | 2.00 | 100 | 100 | 1.00 |
| Printer 3 | 100 | 150 | 0.67 | 200 | 150 | 1.33 |
| Printer 4 | 250 | 200 | 1.25 | 250 | 200 | 1.25 |
| Total |  |  | 4.52 |  |  | 4.18 |

In this embodiment, there are four printers P for which device data has been acquired (number of printers=4). The printers P are arbitrarily assigned numbers 1-4.

In S810 the CPU 15 initializes a counter variable i to 0. In S815 the CPU 15 increments the counter variable i to 1. In S820 the CPU 15 determines whether the counter variable i is greater than the number of printers. If i is greater than the number of printers (S820: YES), it is indicated that the process has already been completed for all printers P, and then the CPU 15 ends the process. Since i=1 at this time and the number of printers is 4 (S820: NO), the CPU 15 advances to S825. In S825 the CPU 15 determines whether the load on the $i^{th}$ printer P (Printer i) exceeds the load limit. The load limit is a value primarily set by the administrator that indicates the maximum load acceptable for the printers P. In this embodiment, the load limit is 0.15. Here, i is currently 1 and the load on Printer 1 is 0.12. Since this load is not greater than the load limit 0.15 (S825: NO), the CPU 15 returns to S815.

After returning to S815 and incrementing i to 2 (S820: NO), the CPU 15 advances again to S825. Since the load on Printer 2 is 0.20 and this load is larger than the load limit 0.15 (S825: YES), the CPU 15 advances to S830.

In S830 the CPU 15 initializes a counter variable j, an exchange device number m, and a maximum effect s to 0. In S835 the CPU 15 increments the counter variable j to 1. In S840 the CPU 15 determines whether i is equivalent to j. If i is equivalent to j at this time (S840: YES), the CPU 15 returns to S835, because Printer i cannot be exchanged with Printer j. Since i=2 and j=1 at this time (S840: NO), the CPU 15 advances to S845.

In S845 the CPU 15 determines whether j is larger than the number of printers. If j is larger than the number of printers (S845: YES), it is indicated that the process has already been completed for all printers P, and then the CPU 15 advances to S875. In this embodiment, the number of printers is 4 and j=1 (S845: NO). Therefore, in S850 the CPU 15 calculates the pre-exchange load. This value is calculated by adding the load on Printer i to the load on Printer j. In S855 the CPU 15 calculates the post-exchange load. This value is calculated according to the expression (toner consumption for Printer i÷toner capacity of Printer j)+(toner consumption for Printer j÷toner capacity of Printer i). For example, if i=2 and j=1, the pre-exchange load is 0.22 and the post-exchange load is 0.14.

In S860 the CPU 15 calculates the effect when exchanging Printer i with Printer j by subtracting the post-exchange load from the pre-exchange load. In S865 the CPU 15 determines whether the calculated effect is greater than the maximum effect s. If the calculated effect is larger (S865: YES), the CPU 15 advances to S870. Otherwise (S865: NO), the CPU 15 returns to S835. In S870 the CPU 15 sets the maximum effect s to the calculated effect and the exchange device number m to j. Since i=2 and j=1 at this time, the effect is 0.08, which is larger than the current maximum effect s=0 (S865: YES). Accordingly, the CPU 15 advances to S870, sets the exchange device number m to 1, and sets the maximum effect s to 0.08.

Subsequently, the CPU 15 returns to S835 and increments j to 2. Since i is also 2 (S840: YES), the CPU 15 returns again to S835. In S835 the CPU 15 increments j to 3 and advances to S850 through S840 and S845 (S840, S845: NO). The CPU 15 calculates the pre-exchange load to be 0.22 in S850 and the post-exchange load to be 0.13 in S855. In S860 the CPU 15 calculates the effect to be 0.09. Since the calculated effect is greater than the maximum effect s=0.08 (S865: YES), the CPU 15 advances to S870 and sets the exchange device number m to 3 and the maximum effect s to 0.09. Returning again to S835, the CPU 15 increments j to 4 and advances to S850 through S840 and S845 (S840, S845: NO). Since i=2 and j=4, the CPU 15 calculates the pre-exchange load to be 0.25 (S850), the post-exchange load to be 0.165 (S855), and the effect to be 0.085 (S860). Since the effect of 0.085 is not greater than the maximum effect s=0.09 (S865: NO), the CPU 15 returns to S835 without performing the process in S870.

In S835 the CPU 15 increments j to 5 and advances to S845 through S840 (S840: NO). Since j=5 is greater than the number of printers=4 (S845: YES), the CPU 15 advances to S875.

By performing the processes of S835-S870 in this way, the exchange device number m is set to the number of the printer P that achieves the maximum effect when exchanged with Printer i.

In S875 the CPU 15 determines whether exchange device number m is 0. If exchange device number m=(S875: YES), then the process in S870 was not performed even once, indicating that no effect is obtained by exchanging Printer i with any other printer P (it is not possible to reduce the load). In this case, the CPU 15 returns to S815 without advising the administrator to make an exchange. Since exchange device number m=3 in the present embodiment (S875: NO), the CPU 15 advances to S880 and creates advice recommending an exchange in the layout positions of Printer i and Printer m (Printer 2 and Printer 3 in the present embodiment). In S885 the content of the advice is transmitted by performing the same notification process (FIG. 8) that was executed in S160 of FIG. 7. In S890 the CPU 15 recalculates the load for each printer P by switching the toner consumption amounts for Printer i and Printer m, and returns to S815.

In the process described above, the notification process in S885 is executed each time a pair of printers P to be exchanged is found. However, it is also possible to issue all the notifications together after completing the entire process.

Table 9 compares the load after exchanging the layout positions of Printers 2 and 3 according to the advice described above with the load from Table 8 prior to the exchange.

TABLE 9

| | Before exchange | | | After exchange | | |
|---|---|---|---|---|---|---|
| | Pages | Tray size | Load | Pages | Tray size | Load |
| Printer 1 | 150 | 250 | 0.60 | 150 | 250 | 0.60 |
| Printer 2 | 200 | 100 | 2.00 | 100 | 100 | 1.00 |
| Printer 3 | 100 | 150 | 0.67 | 200 | 150 | 1.33 |
| Printer 4 | 250 | 200 | 1.25 | 250 | 200 | 1.25 |
| Total | | | 4.52 | | | 4.18 |

From Table 9, it is apparent that the total loads have decreased. Through this process, it is possible to avoid such negative effects as having to prompt the user frequently to replace toner because printing jobs requiring large toner consumption are frequently executed on printers P having a small toner capacity.

Next, a fourth advice notification process according to the preferred embodiment of the present invention will be described. The fourth advice notification process creates a practical layout plan by grouping a plurality of printers P. More specifically, if the third advice notification process is applied to a plurality of departments, the number of printers P to be moved and the distance of movement may be too great. The fourth embodiment advice notification process resolves this problem.

Figure 24:
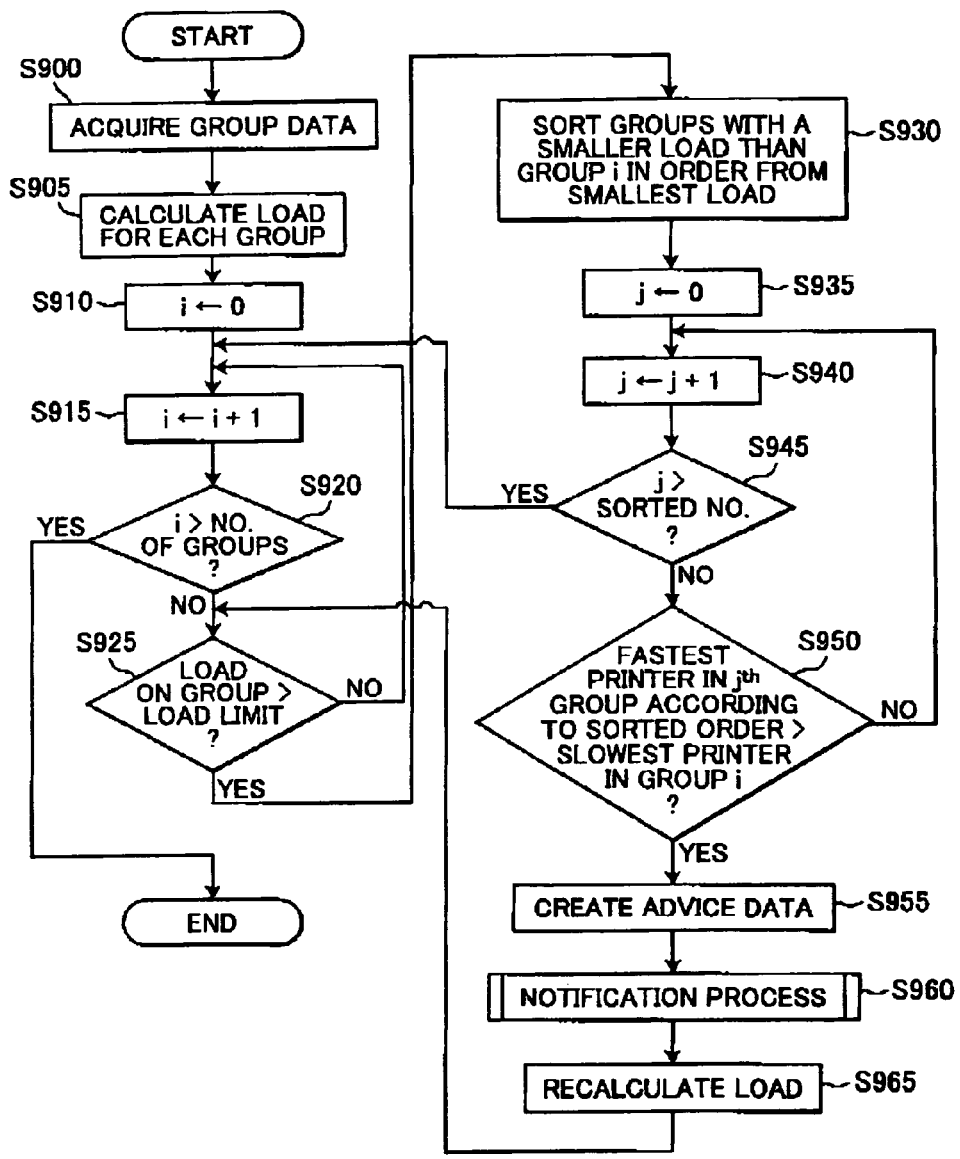
FIG. 24 is a flowchart of a fourth advice notification process executed by the server.

The fourth advice notification process is executed when "Equalize Load Among Groups _____" is selected under "Advice Type" in the Advice Setup window shown in FIG. 4. At this time, the administrator inputs group numbers that are the target of processing, such as "Equalize Load Among Groups 1, 2, 3." This process begins according to the advice schedule set by the administrator, as described above. The fourth advice notification process will be described next with reference to the flowchart in FIG. 24.

At the beginning of the process in S900, the CPU 15 acquires group data for each group G. FIG. 25(*a*) shows an example of acquired group data. In this example, there are four groups G for which data has been acquired (number of groups=4). These groups are assigned the numbers 1-4. The group data includes command data and print data. As shown in FIG. 25(*a*), the CPU 15 acquires the average total number of printed pages per day (pages/day) for each group G as the command data, and the printing speed of each printer P (ppm) as the print data. The total number of printed pages refers to all pages printed by all printers P in the group G.

In S905 the CPU 15 calculates the load on each group G based on the group data. The load is calculated by dividing the total number of printed pages by the cumulative printing speed of all printers P in the group G. The higher the load, the more concentrated the printing jobs are on the printers P in the group G. In S910 the CPU 15 initializes a counter variable i to 0. In S915 the CPU 15 increments the counter variable i by 1. In S920 the CPU 15 determines whether i is greater than the number of groups. If i is greater than the number of groups (S920: YES), it is considered that the process has been completed for all groups G, and the CPU 15 ends the process. However, if i is not greater than the number of groups (S920: NO), then the CPU 15 advances to S925. Since i=1 at this time and the number of groups is 4 (S920: NO), the CPU 15 advances to S925. In S925 the CPU 15 determines whether the total number of printed pages for the i$^{th}$ group G (Group i) exceeds the load limit. If the total number of printed pages exceeds the load limit (S925: YES), then the CPU 15 advances to S930. However, if the total number of printed pages does not exceed the load limit (S925: NO), then the CPU 15 returns to S915. The load limit is a value primarily set by the administrator that indicates the maximum load acceptable for the groups G. In this embodiment, the load limit has been set to 5. Since i=1, referring to FIG. 25(*a*), the total number of printed pages for Group 1 is 150 pages/day, and the cumulative printing speed is 32 ppm. Accordingly, the load is 150/32=4.69. Since this load is smaller than the load limit of 5 (S925: NO), the CPU 15 returns to S915.

In S915 the CPU 15 increments i to 2, again determines NO in S920 (S920: NO), and advances to S925. Since the total number of printed pages for Group 2 is 300 pages/day and the total printing speed is 48 ppm referring to FIG. 25(*a*), the load is 6.25. This load exceeds the load limit (S925: YES), so the CPU 15 advances to S930. In S930 the CPU 15 detects groups G other than Group i (Group 2) that have a load smaller than that of Group i and sorts the groups in order from the smallest load. Since the load of Group 2 is 6.25 referring to FIG. 25(*a*), Groups and 4 are detected as having loads smaller than 6.25. When sorted based on the smallest load, the groups are placed in the order 3, 4, and 1.

In S935 the CPU 15 initializes a counter variable j to 0. In S940 the CPU 15 increments the counter variable j by 1. In S945 the CPU 15 determines whether j is greater than the number of groups G. If j is greater than the number of groups (S945: YES), then the CPU 15 returns to S915. However, if j is not greater than the number of groups (S945: NO), the CPU 15 advances to S950. Since j=1 at this time and the number of sorted groups G is 3 (S945: NO), the CPU 15 advances to S950. In S950 the CPU 15 determines whether the fastest printing speed among printers P in the $j^{th}$ group G according to the sorted order is faster than the slowest printing speed among printers P in Group i. If the fastest printing speed in the $j^{th}$ group G is faster (S950: YES), then the CPU 15 advances to S955. If slower (S950: NO), the CPU 15 returns to S940. In FIG. 25(a), the $j^{th}$ ($1^{st}$) group G in the sorted order is Group 3. The fastest printing speed among printers P in Group 3 is 18 ppm for Printer 8. Further, the slowest printing speed among printers in Group i=2 is 10 ppm for Printer 4 or 7. In this case, the CPU 15 will determine YES in S950 (S950: YES) and advance to S955.

In S955 the CPU 15 creates a notification recommending that the administrator exchange the layout positions of the printer P having the fastest printing speed in the $j^{th}$ group G according to the sorted order and the printer P having the slowest printing speed in Group i. In S960 the CPU 15 executes the same notification process (FIG. 8) that was executed in S160 of FIG. 7. In S965 the CPU 15 recalculates the load on the two groups G when the printer P of the $j^{th}$ group G according to the sorted order is exchanged in layout position with the printer P in Group i based on the content of the notification, and returns to S925. Since i=2 and j=2 at this time, the load is recalculated for Group 2 and Group 3, which is the second group in the sorted order, obtaining the loads 5.36 and 3.23, respectively. While the load on Group 2 has decreased, this load is still greater than the load limit (S925; YES). Hence, the CPU 15 advances to S930, repeats the processes in S930-S950, and creates a notification in S955 advising the exchange of Printers 7 and 9.

FIG. 25(b) shows the results of exchanging Printers 9 and 7 according to this notification. In addition, Table 10 shows the total load for the entire network printing system 1 before and after the exchange.

TABLE 10

|  | Before exchange | | | After exchange | | |
| --- | --- | --- | --- | --- | --- | --- |
|  | Pages | Total speed | Load | Pages | Total speed | Load |
| Group 1 | 150 | 32 | 4.69 | 150 | 32 | 4.69 |
| Group 2 | 300 | 48 | 6.25 | 300 | 62 | 4.84 |
| Group 3 | 200 | 70 | 2.86 | 200 | 56 | 3.57 |
| Group 4 | 120 | 30 | 4.00 | 120 | 30 | 4.00 |
| Total |  |  | 17.80 |  |  | 17.10 |

From Table 10, it is clear that the load on Group 2 that exceeded the load limit has been decreased below the load limit and, moreover, that the load on the overall system has been decreased. In this way, the fourth advice notification process can decrease the load on groups G having a high concentration of printing jobs to a load below the limit and can prevent problems caused by high concentrations of printing jobs.

Further, a YES determination in S945 indicates that no printer P having a printing speed higher than that of the slowest printer P in Group i was found in the other groups G, despite the load of Group i exceeding the load limit. In other words, there is no printer P with which to make an exchange. In this case, the CPU 15 determines what printing speed is necessary for a printer P to be added to Group i in order to reduce the load on Group i below the load limit: searches for a printer P having such a printing speed among the groups G, beginning in order of the group having the lowest load; and, if found, advises the administrator or the user of the terminal 5 to move the printer P found above to Group i. If such a printer P is hot found, the CPU 15 can advise the administrator or the user of the terminal 5 to install a new printer P. This advice should also include the appropriate printing speed for the printer P to be added.

Further, if a NO determination is made in S925 when setting an appropriate lower limit for load, rather than an upper limit, the process may be configured to determine whether the load has not dropped below the lower limit. If the load has dropped below the lower limit, the CPU 15 can search for a printer P that can be removed from the group G without causing the load to exceed the upper limit and, when found, can issue advice to the administrator or the user of the terminal 5 recommending removal of the printer P.

A fifth advice notification process described next may be executed in place of the fourth advice notification process described above. The fifth advice notification process will be described with reference to the flowchart in FIG. 26.

Figure 26:
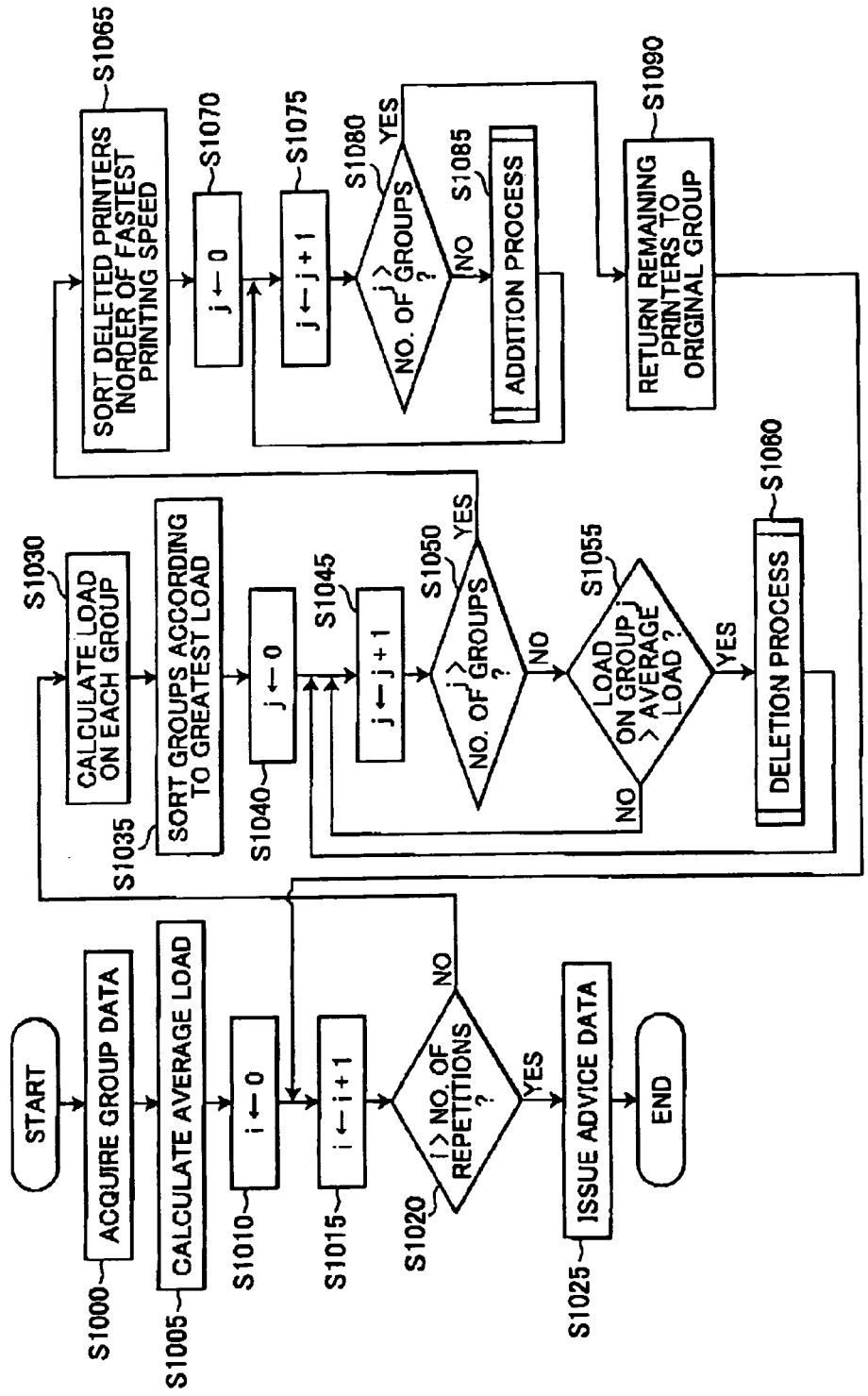
FIG. 26 is a flowchart of a fifth advice notification process executed by the server.

In S1000 at the beginning of the process shown in FIG. 26, the CPU 15 acquires group data for each group G from the external storage device 21. The group data includes the total number of printed pages (pages/day) as command data and the printing speed of each printer P (ppm) as print data. In this embodiment, the total number of printed pages (pages/day) refers to the total number of pages per day printed by all printers P included in a group. FIG. 27(a) shows an example of the group data acquired in S1000. In this embodiment, there are four groups G for which data has been acquired (number of groups=4), and numbers 1-4 have been assigned to these groups G.

In S1005 the CPU 15 finds the average load by dividing the total number of printed pages for all groups G by the cumulative printing speed of all printers P. Using the example of FIG. 27(a), the average load is 3.71. In S1010 the CPU 15 initializes a counter variable i to 0. In S1015 the CPU 15 increments the counter variable i by 1. In S1020 the CPU 15 determines whether i is greater than a number of repetitions. The number of repetitions means a number representing how many times the process of S1030-S1090 will be repeated and is primarily set by the administrator. If i is greater than the number of repetitions (S1020: YES), the CPU 15 advances to S1025. If not greater (S1020: NO), the CPU 15 advances to S1030. In this embodiment, the number of repetitions is assumed to be set to 3. Since i is currently 1 (S1020: NO), the CPU 15 advances to S1030.

In S1030 the CPU 15 finds the load on each group G. The load is found by dividing the total number of printed pages for the group G by the cumulative printing speed. In S1035 the CPU 15 sorts the groups G in order of load, beginning from the largest. Referring to FIG. 27(a), the groups G are arranged in the order Group 2, Group 1, Group 4, and Group 3. In S1040 the CPU 15 initializes a counter variable j to 0. In S1045 the CPU 15 increments the counter variable j by 1. In S1050 the CPU 15 determines whether j is greater than the number of groups. If j is greater than the number of groups (S1050: YES), then the CPU 15 advances to S1065. If not greater (S1050: NO), the CPU 15 advances to S1055. Since j=1 at this time and the number of groups is 4 (S1050: NO), the CPU 15 advances to S1055. In S1055 the CPU 15 determines whether the load on the $j^{th}$ group G according to the sorted order is greater than the average load. If the load on the $j^{th}$ group G is greater than the average load (S1055: YES), the CPU 15 advances to S1060. If not greater (S1055: No), the CPU 15 returns to S1045. In S1060 the CPU 15 performs a deletion process and subsequently returns to S1045.

In the deletion process, printers P are deleted until the difference between the load on the $j^{th}$ group G according to the sorted order and the average load is eliminated. While the term deletion is used, the printers P are not actually deleted from the network printing system 1, but rather data for the printers P in the current process is hypothetically deleted from the group G to which the printers P originally belonged. This process will be described in greater detail later.

By performing the process of S1045-51060, a list of printers P deleted from each group G is created. Referring to FIG. 27(a), the list includes Printers 8, 11, 12, and 15. After performing this process for all groups G (S1050: YES), the CPU 15 advances to S1065. In S1065 the CPU 15 sorts the printers P deleted in S1060 in order of printing speed, beginning from the fastest. In this embodiment, the printers are sorted in the order of Printers 8, 12, 11, and 15.

In S1070 the CPU 15 resets the counter variable j to 0. In S1075 the CPU 15 increments the counter variable j by 1. In S1080 the CPU 15 determines whether j is greater than the number of groups. If j is greater than the number of groups (S1080: YES), the CPU 15 advances to S1090. If not greater (S1080: NO), the CPU 15 performs an addition process in S1085 and subsequently returns to S1075. In the addition process, the CPU 15 adds printers P deleted in the deletion process of S1060 to the $j^{th}$ group G until the difference between the load on the $j^{th}$ group G according to the sorted order and the average load is eliminated. This process will be described later in greater detail. Further, as with the term "deletion" in S1060, "addition" used here does not indicate that the printers P are actually added, but merely signifies hypothetically adding printers P in data used in the process.

By repeating the process of S1075-S1085, all or part of the printers P deleted in S1060 are added to one or a plurality of groups G. Referring to FIG. 27(a), Printers 8 and 12 are added to Group 2, and Printer 15 is added to Group 1. Remaining printers P not added in S1085 are returned to their original group G in S1090.

FIG. 27(b) shows the results of the above process. Table 11 compares the load on each group G before and after the process.

TABLE 11

|  | Before exchange | | | After exchange | | |
| --- | --- | --- | --- | --- | --- | --- |
|  | Pages | Total speed | Load | Pages | Total speed | Load |
| Group 1 | 200 | 34 | 5.88 | 200 | 46 | 3.34 |
| Group 2 | 300 | 38 | 7.89 | 300 | 70 | 4.29 |
| Group 3 | 100 | 80 | 1.25 | 100 | 48 | 2.08 |
| Group 4 | 120 | 42 | 2.85 | 120 | 30 | 4.00 |
| Total | 720 | 194 | 3.71 | 720 | 194 | 3.71 |

From Table 11, it is apparent that the load on each group G has approached the average load, eliminating the concentrated load on some of the groups G.

After performing the process of S1015-S1090 for the number of repetitions (3 in this embodiment; S1020: YES), in S1025 the CPU 15 issues a notification recommending printers P targeted for transfer to change its groups from the group G to other groups, and ends the process. The administrator may be notified according to a method similar to the notification process of FIG. 8.

Figure 28:
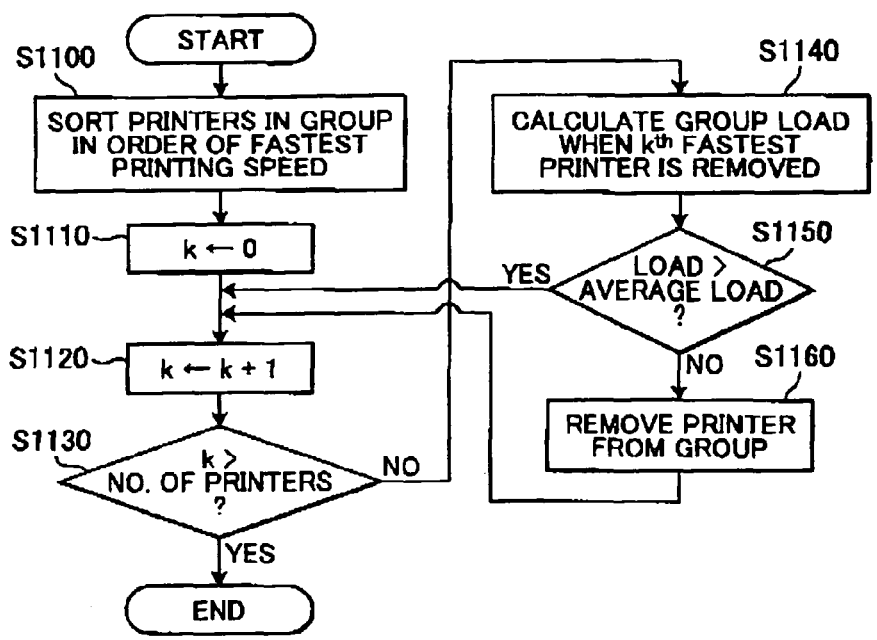
FIG. 28 is a flowchart of a deletion process executed in S1060 of FIG. 26.

Next, the deletion process executed in S1060 will be described with reference to the flowchart in FIG. 28. At the beginning of this process in S1100, the CPU 15 sorts the printers P in the $j^{th}$ group G according to the sorted order based on printing speed, beginning from the fastest. Since the $j^{th}$ group G is Group 4 referring to FIG. 27(a), the printers are arranged in the order 14, 13, and 15. In S1110 the CPU 15 initializes a counter variable k to 0. In S1120 the CPU 15 increments k by 1. In S1130 the CPU 15 determines whether k is greater than the number of printers. If k is greater than the number of printers (S1130: YES), the process ends. If not greater (S1130: NO), the CPU 15 advances to S1140. Since k=1 at this time and the number of printers in Group 4, which is the $j^{th}$ group in the sorted order, is 3 (S1130: NO), the CPU 15 advances to S1140. In S1140 the CPU 15 calculates the load when the printer P having the $k^{th}$ fastest printing speed is deleted from the $j^{th}$ group G according to the sorted order. By deleting Printer 14 from Group 4 shown in FIG. 27(a), the cumulative printing speed is 26 and the load is 4.62. In S1150 the CPU 15 determines whether the load calculated in S1140 is greater than the average load. If the calculated load is greater (S1150: YES), the CPU 15 returns to S1120. If not greater (S1150: NO), then in S1160 the CPU 15 deletes the printer P having the $k^{th}$ fastest printing speed from the $j^{th}$ group G according to the sorted order and returns to S1120. In the case of FIG. 27(a), the load after deletion of 4.62 is greater than the average load of 3.71 (S1150: YES), and the CPU 15 returns to S1120.

By repeating the process of S1120-11160 described above, printers P are deleted until the difference between the load on the group G and the average load has been eliminated. As is apparent from the above description, the load on the group G does not become exactly equivalent to the average load, but approaches the average load.

Figure 29:
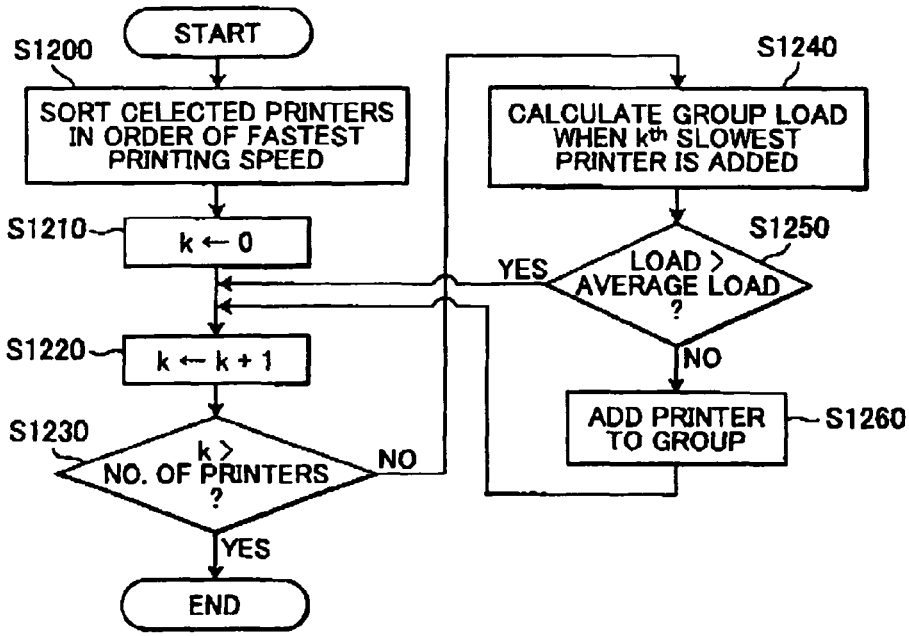
FIG. 29 is a flowchart of an addition process executed in S1085 of FIG. 26.

Next, the addition process executed in S1085 will be described with reference to the flowchart in FIG. 29. At the beginning of the process in S1200, the CPU 15 sorts the deleted printers P according to printing speed, beginning from the slowest. Referring to FIG. 27(a), the printers are sorted into the order 8, 11, 12, and 15. In S1210 the CPU 15 initializes a counter variable k to 0. In S1220 the CPU 15 increments k by 1. In S1230 the CPU 15 determines whether k is greater than the number of deleted printers. If the k is greater than the number of deleted printers (S1230: YES), the process ends. If not greater (S1230: NO), the CPU 15 advances to S1240. Since k=1 at this time and the number of deleted printers is 4 (S1230: NO), the CPU 15 advances to S1240. In S1240 the CPU 15 calculates the load on the group G when the printer P having the $k^{th}$ slowest printing speed is added to the $j^{th}$ group G in the sorted order. For example, if Printer 8 is added to Group 2 shown in FIG. 27(a), the cumulative printing speed in Group 2 is 56, and the load is 5.17. In S1250 the CPU 15 determines whether the load calculated in S1240 is smaller than the average load. If the calculated load is smaller than the average load (51250: YES), then the CPU 15 returns to S1220. If not smaller (S1250: NO), then in S1260 the CPU 15 adds the printer P having the $k^{th}$ slowest printing speed to the $j^{th}$ group G in the sorted order and returns to S1220. In the case of FIG. 27(a), the load calculated in S1240 of 5.17 is greater than the average load of 3.71 (S1250: YES), and the CPU 15 returns to S1220.

By repeating the process of S1220-S1260 described above, printers P are added until the difference between the load on the group G and the average load has been eliminated. As in the process of FIG. 28, the load on the group G does not become perfectly equivalent to the average load in this process, but approaches the average load.

By performing the fifth advice notification process described above, it is possible to obtain advice data for recommending exchanging printers P between groups G.

Next, a sixth advice notification process according to the preferred embodiment will be described. The sixth advice notification process is executed when "Equalize load" has been selected under "Advice Criteria" in the Options window (FIG. 5) and begins when the server 7 receives a print command from the terminal 5. More specifically, when the terminal 5 outputs a print command to a particular printer P, the print command is first transmitted to the server 7. The server 7 then forwards this print command to the specified printer P, and the CPU 15 begins the sixth advice notification process. This advice notification process issues advice for changing the output destination of the print command to another printer P based on device data.

Next, the sixth advice notification process will be described with reference to the flowchart in FIG. 30. In S1300 the CPU 15 acquires device data related to the printers P from the external storage device 21. FIG. 32(a) shows an example of the acquired device data. In this embodiment, there are four printers P for which data is acquired (number of printers=4), and numbers 1-4 are assigned to the printers P. The device data includes print data and command data. As shown in FIG. 32(a), the CPU 15 acquires such data on the printers P as the printing speed, resolution, tray capacity, engine type, and number of colors as the print data, and the total number of printed pages per hour (pages/hour) and the total number of printed pages per hour by each user (pages/hour) as the command data.

In S1302 the CPU 15 determines whether a "half-used" paper function for printing on the opposite side to the printed side of a sheet is on. In this description, the half-used paper is defined as a sheet of paper having two sides; one printed side which has been already printed and the other side which is the opposite side to the printed side. The half-used paper function prints on the opposite side to the printed side of the sheet. The status of the half-used paper function is determined based on whether the box next to "Use Printer with Half-Used Paper" has been checked under "Priority Settings" in the Options window (FIG. 5).

Figure 31:
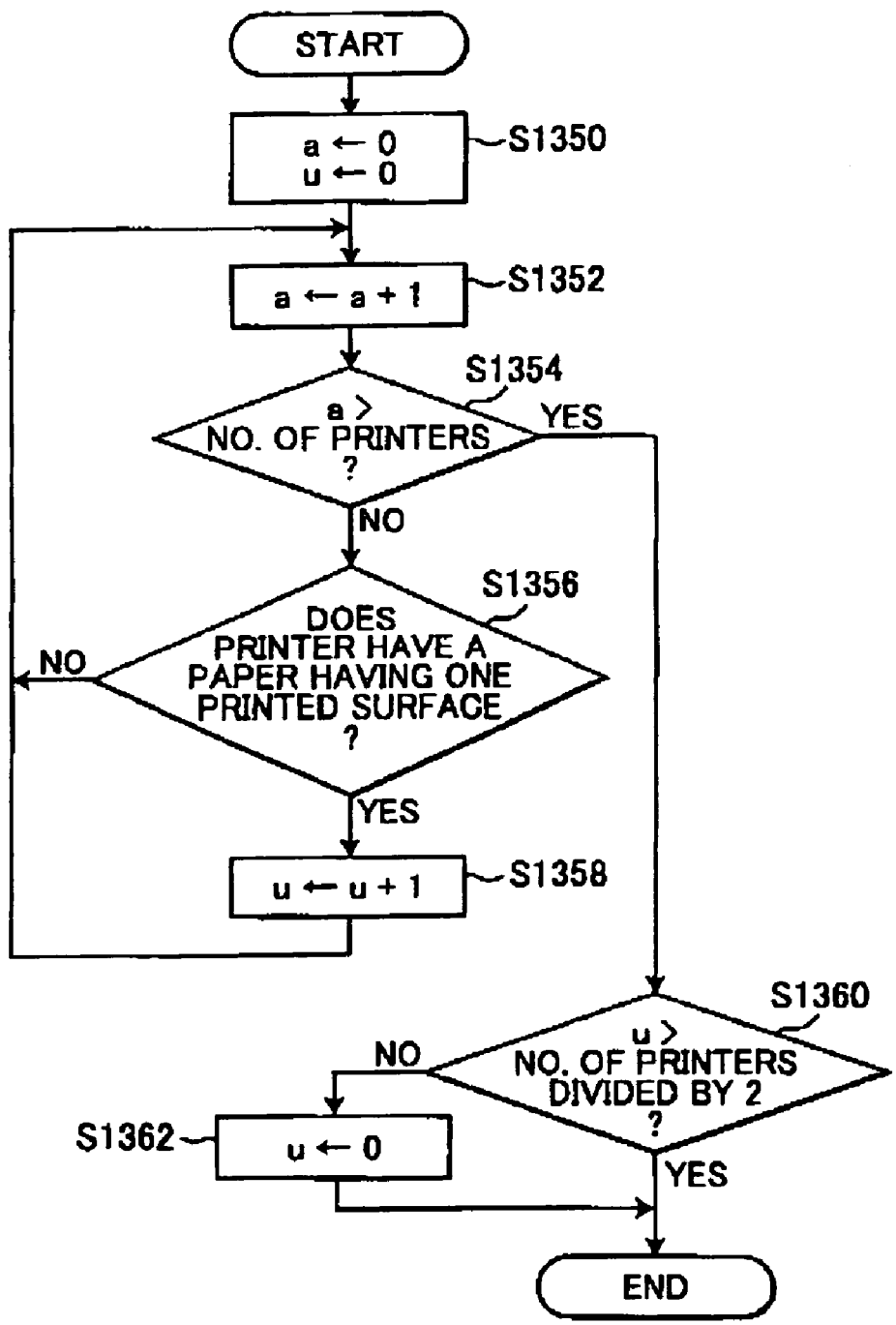
FIG. 31 is a flowchart of a counting process executed in S1306 of FIG. 30.

In this embodiment, the half-used paper function is assumed to be on. Hence, the CPU 15 reaches a YES determination in S1302 (S1302: YES), and executes a counting process in S1306. This counting process will be described with reference to the flowchart in FIG. 31. At the beginning of the process in S1350, the CPU 15 initializes counter variables a and u to 0. In S1352 the CPU 15 increments the counter variable a by 1. In S1354 the CPU 15 determines whether the counter variable a is greater than the number of printers. If the counter variable a is not greater than the number of printers (S1354: NO), then in S1356 the CPU 15 determines whether half-used paper is loaded in the $a^{th}$ printer. If the $a^{th}$ printer has half-used paper (S1356: YES), then in S1358 the CPU 15 increments the counter variable u by 1 and returns to S1352. However, if half-used paper is not loaded in Printer a (S1356: NO), the CPU 15 returns to S1352 without incrementing u.

When counter variable a becomes larger than the number of printers (S1354: YES), the CPU 15 advances to S1360 and determines whether the counter variable u is greater than the number of printers divided by 2. If the counter variable u is greater than this value (S1360: YES), the process ends with no further change to u. However, if the counter variable u is not greater than this value (S1360: NO), then in S1362 the CPU 15 resets the counter variable u to 0 and ends the process.

In other words, if more than half of the printers P have half-used paper, then the process ends with the counter variable u being a value other than 0. However, if only half of the printers P or less have half-used paper, then the counter variable u is 0 when the process ends. In the case shown in FIG. 32(a), the number of printers is 4 and two of the printers P have half-used paper. Accordingly, the CPU 15 sets the counter variable u to 0 in S1362 and ends the process.

Figure 30:
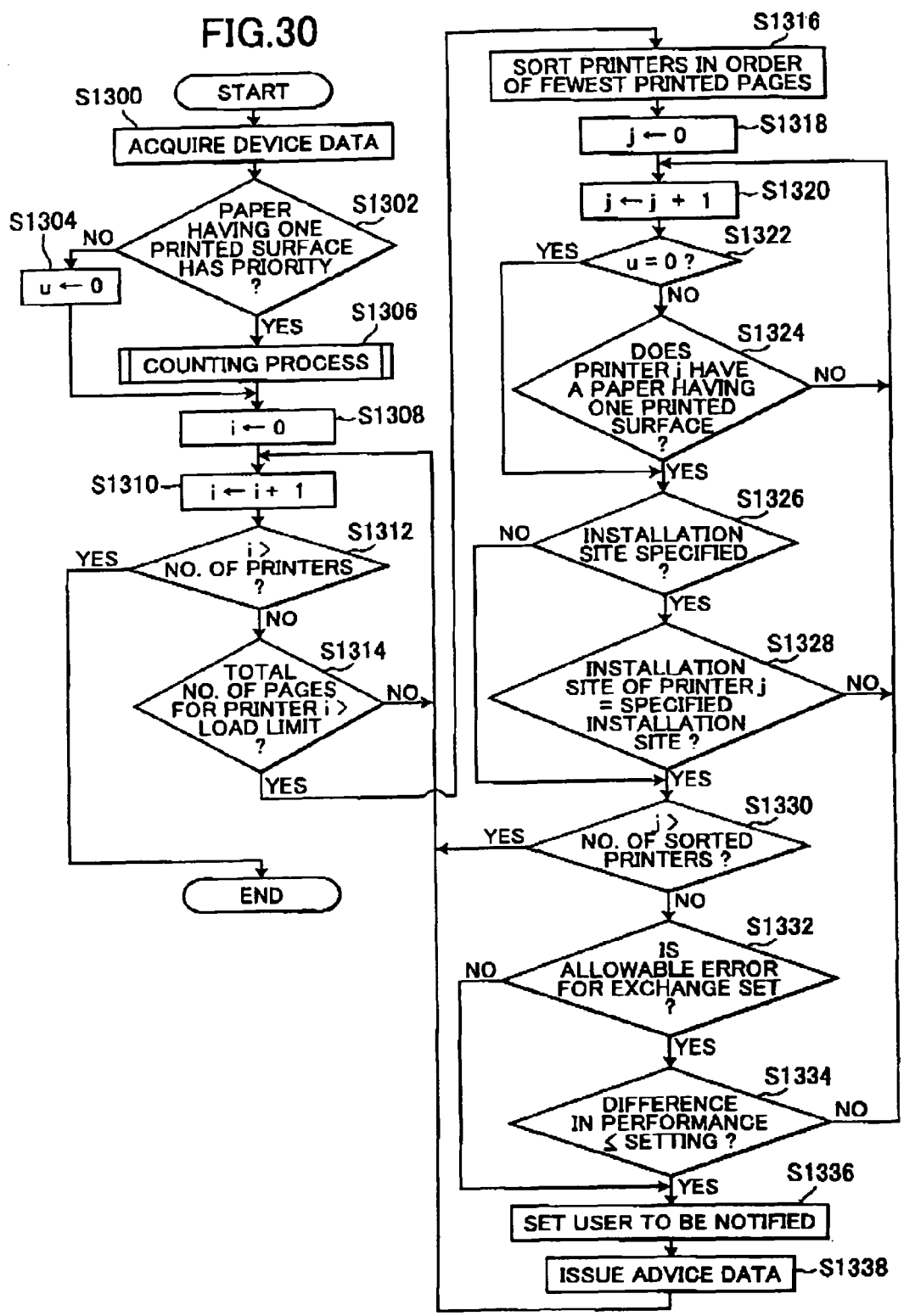
FIG. 30 is a flowchart of a sixth advice notification process executed by the server.

After completing the counting process, the CPU 15 advances to S1308 in FIG. 30. If the half-used paper function is determined not to be on in S1302 (S1302: NO), then the CPU 15 sets the counter variable u to 0 in S1304 and advances to S1308.

In S1308 the CPU 15 initializes a counter variable i to 0. In S1310 the CPU 15 increments the counter variable i by 1. In S1312 the CPU 15 determines whether the counter variable i is greater than the number of printers. If i is greater than the number of printers (S1312: YES), then the process has been completed for all printers P and the CPU 15 ends the process. Since the counter variable i is 1 at this time and the number of printers is 4 (S1312: NO), in S1314 the CPU 15 determines whether the total number of printed pages for the $i^{th}$ printer P (Printer i) has not exceeded the load limit. The load limit is a value primarily set by the administrator that indicates the maximum load acceptable for the printers P. In this case, the load limit is assumed to be set to 100 pages/hour.

Since the counter variable i is currently 1, the total number of printed pages per hour for Printer 1 is 60 pages/hour according to FIG. 32(a). Since this value is less than the load limit of 100 pages/hour (S1314: NO), the CPU 15 returns to S1310.

In S1310 the counter variable i is again incremented by 1 to 2. The CPU 15 reaches a NO determination again in S1312 and in S1314 compares the load on Printer 2 to the load limit. According to FIG. 32(a), the total number of printed pages per hour for Printer 2 is 110 pages/hour. Since this value exceeds the load limit (S1314: YES), the CPU 15 advances to S1316, searches for printers P other than Printer i having a total number of printed pages less than Printer i, and sorts these printers P according to the total number of printed pages, beginning from the smallest. In the case shown in FIG. 32(a), all printers P other than Printer 2 have a smaller total number of printed pages than Printer 2. When sorted in order beginning from the lowest total number of printed pages, the printers are arranged in the order 4, 3, and 1. Since three printers P have been sorted at this time, a sorted device number is set to 3.

In S1318 the CPU 15 initializes a counter variable j to 0. In S1320 the CPU 15 increments the counter variable j by 1. In S1322 the CPU 15 determines whether the counter variable u is 0. If u is not 0 (S1322: NO), then in S1324 the CPU 15 determines whether half-used paper is loaded in the $j^{th}$ printer P according to the sorted order. If the $j^{th}$ printer P does not have half-used paper (S1324: NO), the CPU 15 returns to S1320. However, if the $j^{th}$ printer P has half-used paper (S1324: YES), the CPU 15 advances to S1326. Since the counter variable u has been set to 0 in S1304 of the present embodiment (S1322: YES), the CPU 15 advances directly to S1326 without performing the process in S1324.

In other words, when the half-used paper function is on, the process in S1324 is skipped if half the printers P or less have half-used paper. This process is performed because using the half-used paper function may cause a high concentration of printing jobs to be sent to printers P having half-used paper when there are few printers P with half-used paper.

In S1326 the CPU 15 determines whether an installation site has been specified. An installation site can be specified by checking "Use Printers at Installation Site _____" and inputting a desired installation site under "Priority Settings" in the Options window (FIG. 5). If the CPU 15 determines that an installation site has been specified (S1326: YES), then in S1328 the CPU 15 determines whether the installation site of the $j^{th}$ printer P according to the sorted order is the specified installation site. If so (S1328. YES), the CPU 15 advances to S1330. If not (S1328: NO), the CPU 15 returns to S1320.

In this embodiment, an installation site is not assumed to be set (S1326: NO), so that the CPU 15 advances to S1330. In S1330 the CPU 15 determines whether the counter variable j is greater than the number of sorted printers P, that is, the sorted device number. If j is greater than the sorted device number (S1330: YES), the CPU 15 returns to S1310. If not greater (S1330: NO), the CPU 15 advances to S1332. In S1332 the CPU 15 determines whether an allowable error for exchange has been set. The allowable error exchange is that the administrator can selectively set in the Options window (FIG. 5) to indicate the degree of performance difference that is acceptable between printers P targeted for exchange. In this embodiment, performance differences of the printers P that can be specified include printing speed, resolution, tray capacity, engine type, and number of colors.

If the CPU 15 determines in S1332 that an allowable error has been set (S1332: YES), then in S1334 the CPU 15 determines whether the difference in the performance of the $j^{th}$ printer P according to the sorted order and the performance of Printer i is within the set range. If the error falls within the set range (S1334: YES), the CPU 15 advances to S1336. However, if the error falls outside the set range (S1334: NO), the CPU 15 returns to S1320. On the other hand, if the CPU 15 reaches a NO determination in S1332 (S1332: NO), then the CPU 15 skips the process in S1334 and advances directly to S1336. In the present embodiment, a printing speed error of 2 ppm is assumed to be set. Since i=2 and j=1 at this time, the difference between the printing speed of 10 ppm for Printer 4, which is the $1^{st}$ at printer P according to the sorted order, and the printing speed of 15 ppm for Printer 2 is 5 ppm. Since 5 ppm exceeds the allowable error of 2 ppm (S1334: NO), the CPU 15 returns to S1320.

In S1320 the CPU 15 increments counter variable j to 2 and advances to S1334 through S1322, S1326, S1330, and S1332 (S1322: YES; S1326, S1330: NO; S1332: YES). The speed difference between the printing speed of 14 ppm for Printer 3, which is the $2^{nd}$ printer P in the sorted order, and the printing speed of 15 ppm for Printer 2 is 1 ppm. Since 1 ppm is smaller than the set allowable error of 2 ppm (S1334: YES), the CPU 15 advances to S1336.

In S1336 the CPU 15 sets a "user to be notified" as the user that prints the largest volume on Printer i. According to FIG. 32(a), users D, E, F, and G have printed on Printer i=2, and user D has printed the largest volume on Printer 2. Accordingly, the CPU 15 sets the "user to be notified" to D.

In S1338 the CPU 15 issues a notification to the user to be notified advising the user to change the user's printing destination from Printer i to the $j^{th}$ printer P according to the sorted order. In this embodiment, user D is advised to change the printing destination from Printer 2 to Printer 3, which is the $2^{nd}$ printer P in the sorted order. The user can be notified by such a method as transmitting e-mail from the server 7 to user D or displaying a message on the display of the terminal 5 currently used by user D. Alternatively, the notification may be printed out on one of the printers P. In addition to the user, the administrator may also be notified. After issuing the notification, the CPU 15 returns to S1310 and repeats the process for Printers 3 and 4, which are the $3^{rd}$ and $4^{th}$ printers P in the sorted order.

Figure 32B:
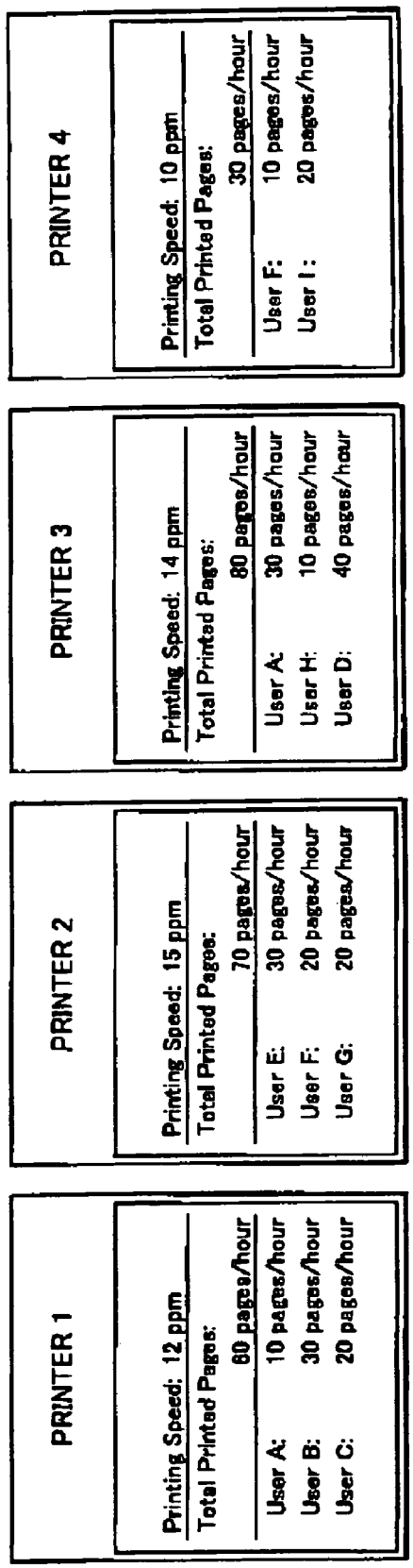
FIG. 32(b) shows the status of printers after performing the sixth advice notification process.

FIG. 32(b) shows the results of performing the above process on four printers P, after the user receiving the notification has changed the output destination according to the advice in the notification. As shown in FIG. 32(b), the high concentration of printing on some of the printers P (Printer 2 in the present example) has been reduced. In this way, the present process can distribute printing jobs to reduce the time a user must wait, and to reduce the excessive load on some of the printers P.

Further, since this process begins when the user outputs a print command and advice data created in the process is issued automatically to the user, the user can receive such advice without making an active attempt to acquire the advice.

Next, a seventh advice notification process according to the preferred embodiment will be described. The seventh advice notification process is executed when "Reduce costs" has been selected under "Advice Criteria" in the Options window (FIG. 5), and begins when the server 7 receives a print command from the terminal 5. Specifically, when the terminal 5 outputs a print command to a specific printer P, the print command is first transmitted to the server 7. Subsequently, the server 7 forwards the print command to the specified printer P, and the CPU 15 starts the seventh advice notification process. This advice notification process advises the user on changing the printer P used as the output destination, based on device data.

Figure 33:
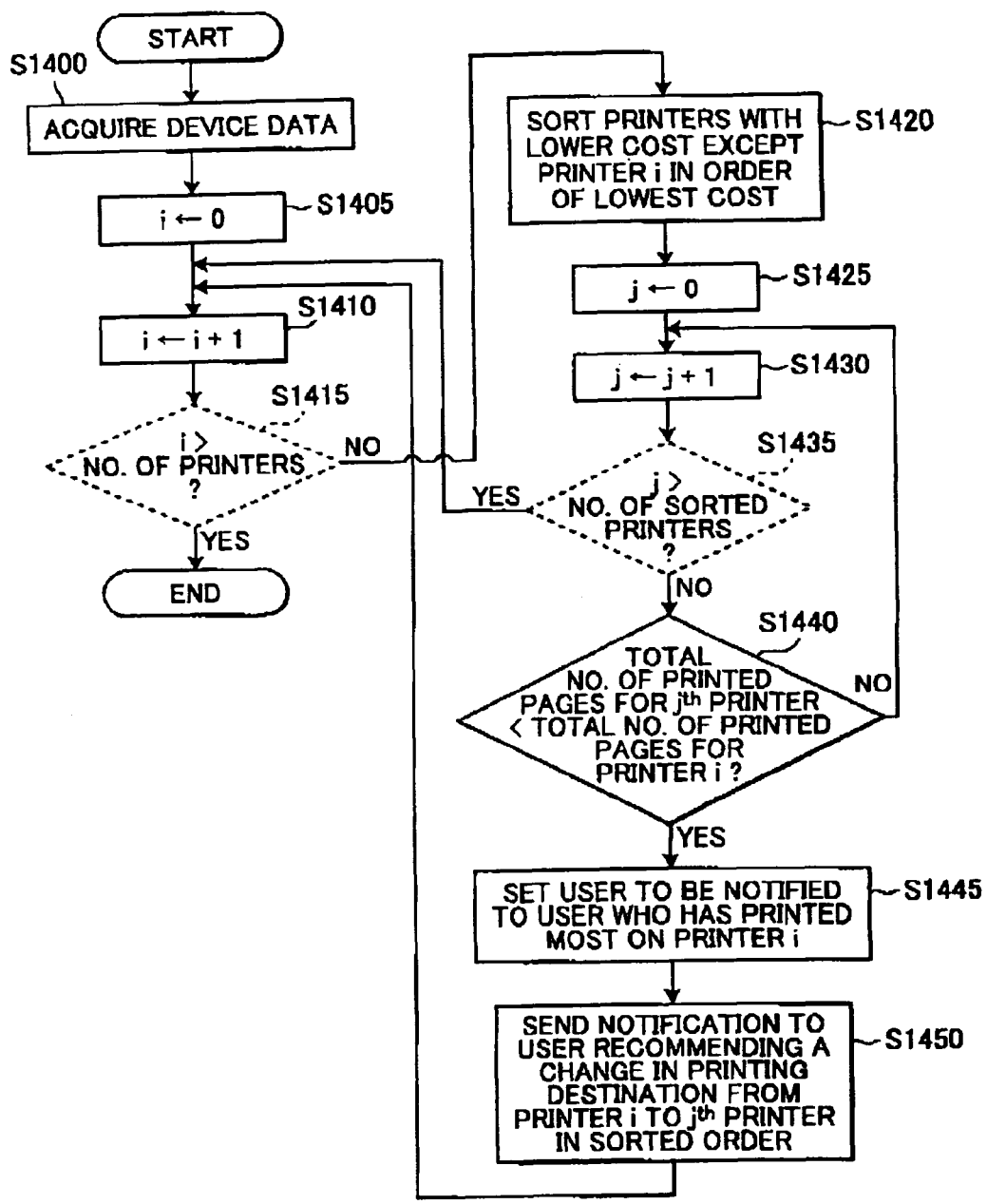
FIG. 33 is a flowchart showing a seventh advice notification process executed by the server.

Next, the seventh advice notification process will be described with reference to the flowchart in FIG. 33. At the beginning of the process in S1400, the CPU 15 acquires device data related to the printers P from the external storage device 21. FIG. 34 shows an example of the acquired device data. The device data includes print data and command data. As shown in FIG. 34, the CPU 15 acquires at least costs related to printing yen/page) as the print data, and total number of printed pages per hour (pages/hour) and total number of printed pages per hour by user (pages/hour) as the command data. In the present embodiment, there are four printers P for which data has been acquired (number of printers=4), and numbers 1-4 have been assigned to these printers P.

In S1405 the CPU 15 initializes a counter variable i to 0. In S1410 the CPU 15 increments the counter variable i by 1. In S1415 the CPU 15 determines whether the counter variable i is greater than the number of printers. If i is greater than the number of printers (S1415: YES), then the process ends. If not greater (S1415: NO), then in S1420 the CPU 15 sorts the printers P other than Printer i having a lower cost than that of Printer i in order of cost, beginning from the lowest. In S1425 the CPU 15 initializes a counter variable j to 0. In S1430 the CPU 15 increments the counter variable j by 1. In S1435 the CPU 15 determines whether the counter variable j is greater than the number of sorted printers P. If j is greater than the number of sorted printers P (S1435: YES), the CPU 15 returns to S1410. If not greater (S1435: NO), the CPU 15 advances to S1440.

In S1440 the CPU 15 determines whether the total number of printed pages for the $j^{th}$ printer P according to the sorted order is smaller than the total number of printed pages for Printer i. If smaller (S1440: YES), then in S1445 the CPU 15 sets a user to be notified as the user who has printed the largest volume on Printer i. In S1450 the CPU 15 transmits a notification to the user to be notified recommending that the user change the printing destination from Printer i to the $j^{th}$ printer P according to the sorted order, and returns to S1410. However, if a NO determination is reached in S1440 (S1440: NO), the CPU 15 returns to S1430.

With the seventh advice notification process described above, cost data for each printer P is obtained and compared. When printers P with a high cost have a larger total number of printed pages, the user is advised to change output to a printer P having a lower cost, thereby increasing use on less expensive printers P as much as possible to reduce the overall cost of the network printing system 1. In addition to the user, the administrator may also be notified. Further, instead of advice on changing the output destination, the advice may recommend switching the layout positions of Printer i and the $j^{th}$ printer P according to the sorted order. Possible methods of notification are sending e-mail and displaying a message on the display 310 of the printer P currently used by the user. Alternatively, the notification may be printed out on one of the printers P.

Next, an eighth advice notification process according to the preferred embodiment will be described. The eighth advice notification process is executed when "Optimize Usage Locations" is selected under "Advice criteria" in the Options window (FIG. 5) to correct the layout of printers in inconvenient locations. Sometimes a particular printer P that the user needs to use is positioned far away from the user. For example, a printer P designed for color printing may be positioned far away from a user who frequently performs color printing. The eighth advice notification process automatically detects inconvenient layout positions and issues advice on changing the layout of the printers P.

More specifically, the CPU 15 detects which printers P each terminal 5 frequently uses based on positional data for each printer P and each terminal 5, and data concerning the destination of print commands outputted from each terminal 5 and the number of printed pages stored in the external storage device 21 of the server 7. Next, the CPU 15 detects the distance between each terminal 5 and the printers P used most frequently by that terminal 5. If the positions are separated by a predetermined distance or more, a notification is issued to the administrator regarding this problem. The notification includes advice for the administrator to move the printer P closer to the terminal 5. This notification can be issued according to the same method as the notification process described above (FIG. 8). The notification may include a predetermined phrase, such as "An improvement in printer layout position is necessary. Recommend exchanging current printer with _____ printer."

Next, variations of the advice notification process will be described. These advice notification processes ignore print commands that are outputted during the specified exception period.

In some cases, an inordinate amount of special printing must be performed periodically, such as printing large amounts of material in a short time period which is close to a cut-off day of each month. If the advice notification processes consider printing commands outputted during such periods, the log data will be distorted, making it impossible to provide advice suitable for normal printing operations. By considering this distortion in the log data, the advice notification processes of the preferred embodiment can provide suitable advice for normal printing operations.

The administrator accomplishes this by first setting a desired exception period in an Exception Period Setup window, such as that shown in FIG. 35. A plurality of exception periods can be set. As shown in FIG. 36, two exception periods have been set. The Exception Period Setup window may be displayed by clicking on the "Exception Period Setup" button provided in the Advice Setup window (FIG. 4). By displaying an exception period list, such as that shown in FIG. 36, the administrator can easily confirm the specified exception periods.

Next, this advice notification process will be described with reference to the flowchart in FIG. 37 using the sixth advice notification process as an example. The advice notification process shown in FIG. 37 is nearly identical to the sixth advice notification process. However, after acquiring device data in S1300, in S1301 the CPU 15 deletes the acquired total number of printed pages and all numbers of printed pages related to print commands issued during the exception periods. By deleting data relevant to the specified exception periods in this way, it is possible to remove the data distortion in the log data in order to issue reliable advice data.

While this advice notification process was described using the sixth advice notification process as an example, the first through fifth, seventh, and eighth advice notification processes may also be varied in the same way.

According to the preferred embodiments described above, the administrator of the network printing system or a user of a terminal device may change the printer used as the destination for outputting print commands, change the layout positions of printers, install a new printer, or remove a printer based on generated advice data, thereby lightening the burden on the administrator and the user. Further, an efficient network printing system can be constructed by changing the layout of the printers according to the generated advice data.

In the embodiment described above, the administrator may select criteria by which advice data is created (load or cost, for example) and can acquire desired advice conforming to criteria selected by the administrator at a desired timing set by the administrator. By directing the system to create advice data at regular intervals, the administrator can periodically obtain advice data reflecting the status of load on the system.

While the invention has been described in detail with reference to specific embodiments thereof, it would be apparent to those skilled in the art that many modifications and variations may be made therein without departing from the spirit of the invention, the scope of which is defined by the attached claims.

For example, device data, and print data, and command data included in group data are acquired from the external storage device 21 of the server 7 in the embodiments described above. However, this data may also be acquired from the storage device 300 in each printer P.

Further, while the advice notification processes in the preferred embodiment are configured to create and issue advice data automatically, the server may be configured to send the advice data after receiving an instruction to do so or may just create the advice data. When only creating advice data, the server may create a file storing the details of the advice in the external storage device 21. When the administrator wishes to view the content of the advice, the file containing the advice may be viewed in a program (editor, browser, etc.) other than the program that implements the process described above, or may be viewed using a file browsing function commonly provided in an operating system, provided that such an operating system has been installed on the information processing device.

While the advice notification processes described above other than the fifth advice notification process create and issue advice data on each loop of the process, this advice data may be combined and issued at once just prior to ending the process.

While the sixth and seventh advice notification processes execute when a print command has been received from a user, these processes may be started according to a schedule set by the administrator, as in the other advice notification processes. Further, all advice notification processes may be configured to start automatically when the number of printers changes. Since a change in the number of printers is likely to result in a change in printing commands for each printer, the user can obtain advice conforming to the changes in the network configuration if the processes are performed at this time.

In the preferred embodiment described above, settings under "Allowable Error for Exchange" in the Options window (FIG. 5) are only considered in the seventh advice notification process. However, these settings may also be considered in the other advice notification processes.

Further, in the preferred embodiments described above, the first through third, sixth, and seventh advice notification processes are performed for all printers P included in the network printing system 1. However, these processes may be performed for only printers P included in a specific group. In this case, the Advice Setup window shown in FIG. 4 may include a "Target Printers in Group _____" item under "Advice Type" for specifying a desired group number. Also, the administrator may add new groups and increase or decrease the printers P in existing groups as desired.

While exception periods are set in the variation of the preferred embodiments described above, the administrator may instead set special periods so that the process creates advice data based only on print commands issued during the special periods (a period of one day or one week, for example).

In addition to an existing network printing system, the information processing device of the preferred embodiment may also be applied to a network printing system that does not yet exist. For example, it is possible to set the layout of printers in a network printing system planned for future construction by referencing advice data obtained by entering the estimated number of printers, number of terminal devices, network configuration, print data, and command data into the information processing device.

An information processing device, network printing system, and computer program according to the present invention can be used in a broad range of businesses.

It is understood that the foregoing description and accompanying drawings set forth the preferred embodiments of the invention at the present time. Various modifications, additions and alternative designs will, of course, become apparent to those skilled in the art in light of the foregoing teachings without departing from the spirit and scope of the disclosed invention. Thus, it should be appreciated that the invention is not limited to the disclosed embodiments but may be practiced within the full scope of the appended claims.

The invention claimed is:

1. An information processing device connected to a plurality of printing devices and at least one terminal device via a network, each of the plurality of printing devices being placed at a physical structural position to be connected to the network, the plurality of printing devices being divided into two groups, comprising:
   advice data creating means for creating advice data based on a performance and a previous frequency of usages of each of the plurality of printing devices,
   wherein the advice data creating means compares the performance and the previous frequency of usages of the plurality of printing devices to each other to prepare a message based on the comparison,
   wherein the advice data includes the message indicating that at least one of the plurality of printing devices in one of the two groups is required to be moved from a current physical structural position to another physical structural position in an other of the two groups to rearrange the plurality of printing devices in order to balance loads on the plurality of printing devices,
   wherein the message is displayed on the terminal device, or sent to a user;
   further comprising selecting criteria means for selecting criteria for creating advice data, wherein the advice data creating means creates the advice data based on the criteria for creating advice data selected by the criteria selecting means;
   wherein the advice data creating means includes:
   load calculating means for calculating a load on at least one of the plurality of printing devices based on the performance and the previous frequency of usages when a first criteria related to a load on at least one of the plurality of printing devices is selected; and
   data creating means for creating advice data to reduce the load of the at least one of the plurality of printing devices;
   wherein the previous frequency of usages includes a number of printed pages per unit time in each of the plurality of printing devices, and the load calculating means calculates the load based on the number of printed pages per unit time; and
   wherein the advice data creating means further includes upper limit establishing means for establishing an upper load limit value and comparing means for comparing the established upper load limit value with the calculated load, and the data creating means creates advice data when the calculated load exceeds the upper load limit value.

2. The information processing device according to claim 1, wherein the criteria for creating advice data includes at least one of a first criteria related to load on at least one of the plurality of printing devices and a second criteria related to cost of at least one of the plurality of printing devices.

3. The information processing device according to claim 1, wherein the advice data created by the advice data creating means recommends replacing a position of a predetermined printing device with a position of another printing device.

4. The information processing device according to claim 1, wherein the performance includes a printing speed of each of the plurality of printing devices, and the load calculating means calculates the load based on the printing speed.

5. The information processing device according to claim 1, wherein the upper load limit value is established by a user by using the upper limit establishing means.

6. The information processing device according to claim 1, wherein the performance includes a tray size of a paper supply tray of each of the plurality of printing devices, and the load calculating means calculates a ratio of the tray size to the number of printed pages per unit time as the load of each printing device.

7. The information processing device according to claim 6, wherein the load calculating means includes:
   pre-exchange load calculating means for calculating a sum of a first load and a second load as a pre-exchange load, the first load being imposed on a first printing device in which a first paper supply tray is inserted, and the second load being imposed on a second printing device in which a second paper supply tray is inserted; and
   post-exchange load calculating means for calculating a sum of a third load and a fourth load as a post-exchange load, the third load being imposed on the first printing device in which the second paper supply tray is inserted, and the fourth load being imposed on the second printing device in which the first paper supply tray is inserted; wherein the data creating means creates advice data to recommend an exchange of the first and second paper supply trays if the post-exchange load is less than the pre-exchange load.

8. The information processing device according to claim 7, wherein the data creating means creates advice data to recommend the exchange of the first and second paper supply trays when a type of the first paper supply tray is identical with a type of the second paper supply tray.

9. The information processing device according to claim 7, wherein the data creating means creates advice data to recommend an exchange of layout positions of the first and second printing devices when a type of the first paper supply tray is different from a type of the second paper supply tray.

10. The information processing device according to claim 7, wherein the advice data creating means further includes effect calculating means for subtracting the post-exchange load from the pre-exchange load to obtain an effect, the data creating means creates advice data to recommend the exchange of the paper supply trays to maximize the calculated effect.

11. The information processing device according to claim 1, wherein the previous frequency of usages includes an amount of toner consumption per unit time in each of the plurality of printing devices, and the performance includes a toner capacity in each of the plurality of printing devices.

12. The information processing device according to claim 1, wherein the advice data created by the advice data creating means recommends the terminal device to switch an output destination of the print commands from a predetermined printing device to another printing device.

13. The information processing device according to claim 12, wherein:

the advice data creating means further includes error establishing means for establishing an error value; and when a difference between a device performance of the predetermined printing device and a device performance of the another printing device is equal to or less than the established error value, the advice data creating means creates advice data.

14. The information processing device according to claim 13, wherein the device performance includes at least a printing speed of each of the plurality of printing devices.

15. The information processing device according to claim 13, wherein the error value is established by a user by using the error establishing means.

16. The information processing device according to claim 12, wherein the advice data recommends a terminal device or a user thereof to change an output destination, the terminal device or the user having printing the largest volume among the predetermined printing devices.

17. The information processing device according to claim 1, wherein the advice data creating means creates advice data to correct an uneven distribution of loads among the plurality of printing devices.

18. The information processing device according to claim 1, wherein the advice data creating means creates advice data to decrease loads on the plurality of printing devices to an average load or less.

19. The information processing device according to claim 1, wherein the advice data creating means includes: cost calculating means for calculating a cost required for at least one of the plurality of printing devices based on the performance and the previous frequency of usages when a second criteria related to cost of at least one of the plurality of the printing devices is selected; and data creating means for creating advice data to reduce the cost of the at least one of the plurality of printing devices.

20. The information processing device according to claim 1, further comprising:

notice destination establishing means for establishing a notice destination; and notifying means for notifying the advice data to the established notice destination.

21. The information processing device according to claim 1, further comprising exception period establishing means for establishing an exception period, wherein the advice data creating means ignores command data related to print commands outputted during the established exception period and creates advice data.

22. The information processing device according to claim 1, wherein the previous frequency of usages includes log data.

23. A network printing system comprising:

an information processing device;

a plurality of printing devices;

at least one terminal device; and a network for connecting the information processing device, the plurality of printing devices, and the at least one terminal device, each of the plurality of printing devices being placed at a physical structural position to be connected to the network, the plurality of printing devices being divided into two groups, wherein the information processing device comprises advice data creating means for creating advice data based on a performance and a previous frequency of usages of each of the plurality of printing devices, wherein the advice data creating means compares the performance and the previous frequency of usages of the plurality of printing devices to each other to prepare a message based on the comparison, wherein the advice data includes the message indicating that at least one of the plurality of printing devices in one of the two groups is required to be moved from a current physical structural position to another physical structural position in an other of the two groups to rearrange the plurality of printing devices in order to balance loads on of the plurality of printing devices, wherein the message is displayed on the terminal device, or sent to a user; further comprising selecting criteria means for selecting criteria for creating advice data, wherein the advice data creating means creates the advice data based on the criteria for creating advice data selected by the criteria selecting means;

wherein the advice data creating means includes:

load calculating means for calculating a load on at least one of the plurality of printing devices based on the performance and the previous frequency of usages when a first criteria related to a load on at least one of the plurality of printing devices is selected; and data creating means for creating advice data to reduce the load of the at least one of the plurality of printing devices;

wherein the previous frequency of usages includes a number of printed pages per unit time in each of the plurality of printing devices, and the load calculating means calculates the load based on the number of printed pages per unit time; and wherein the advice data creating means further includes upper limit establishing means for establishing an upper load limit value and comparing means for comparing the established upper load limit value with the calculated load, and the data creating means creates advice data when the calculated load exceeds the upper load limit value.

24. A non-transitory computer-readable storage medium that stores a computer-executable program for an information processing device connected to a plurality of printing devices and at least one terminal device via a network, each of the plurality of the printing devices being placed at a physical structural position to be connected to the network, the plurality of printing devices being divided into two groups, the program executing the steps of:
   acquiring a performance related to each of the plurality of printing devices; acquiring a previous frequency of usages of each of the plurality of printing devices;
   creating advice data based on the performance and the previous frequency of usages of each of the plurality of printing devices; and
   comparing the performance and the previous frequency of usages of the plurality of printing devices to each other to prepare a message based on the comparison,
   wherein the advice data includes the message indicating that at least one of the plurality of printing devices in one of the two groups is required to be moved from a current physical structural position to another physical structural position in an other of the two groups to rearrange the plurality of printing devices in order to balance loads on the plurality of printing devices,
   wherein the message is displayed on the terminal device, or sent to a user;
   further comprising selecting criteria means for selecting criteria for creating advice data, wherein the advice data creating means creates the advice data based on the criteria for creating advice data selected by the criteria selecting means;
   wherein the advice data creating means includes:
   load calculating means for calculating a load on at least one of the plurality of printing devices based on the performance and the previous frequency of usages when a first criteria related to a load on at least one of the plurality of printing devices is selected; and
   data creating means for creating advice data to reduce the load of the at least one of the plurality of printing devices:
   wherein the previous frequency of usages includes a number of printed pages per unit time in each of the plurality of printing devices, and the load calculating means calculates the load based on the number of printed pages per unit time; and
   wherein the advice data creating means further includes upper limit establishing means for establishing an upper load limit value and comparing means for comparing the established upper load limit value with the calculated load, and the data creating means creates advice data when the calculated load exceeds the upper load limit value.

25. The computer-readable storage medium according to claim 24, wherein the creating of the advice data is based on the performance, the previous frequency of usages and selected criteria for creating advice.

26. The computer-readable storage medium according to claim 25, wherein the criteria for creating advice includes at least one of a first criteria and a second criteria, the first criteria being related to a load on the printing device, and the second criteria being related to a cost of the printing device.

27. The computer-readable storage medium according to claims 25, wherein the advice data includes:
   a load on at least one of the plurality of printing devices based on the performance and the previous frequency of usages when a first criteria is selected; and
   an advice to reduce the load of the at least one of the plurality of printing devices.

28. The computer-readable storage medium according to claim 27, wherein the previous frequency of usages includes a number of printed pages per unit time in each of the plurality of printing devices, and the load is calculated based on the number of printed pages per unit time.

29. The computer-readable storage medium according to claim 28, wherein the performance includes a printing speed of each of the plurality of printing devices, and the load is calculated based on the printing speed.

30. The computer-readable storage medium according to claim 28, wherein the advice data includes an upper load limit value and the advice data is created when the calculated load exceeds the upper load limit value.

31. The computer-readable storage medium according to claim 30, wherein the upper load limit value is established by a user by using an upper limit value establishing means.

32. The computer-readable storage medium according to claim 28, wherein:
   the performance includes a tray size of a paper supply tray of each of the plurality of printing devices; and
   the load of each of the plurality of printing devices is a ratio of the tray size to the number of printed pages per unit time.

33. The computer-readable storage medium according to claim 32, wherein the load includes:
   a pre-exchange load which is a sum of a first load and a second load, the first load being imposed on a first printing device in which a first paper supply tray is inserted, and the second load being imposed on a second printing device in which a second paper supply tray is inserted; and
   a post-exchange load which is a sum of a third load and a fourth load, the third load being imposed on the first printing device in which the second paper supply tray is inserted, and the fourth load being imposed on the second printing device in which the first paper supply tray is inserted,
   wherein the advice data recommends an exchange of the paper supply trays when the post-exchange load is less than the pre-exchange load.

34. The computer-readable storage medium according to claim 33, wherein the advice data recommends an exchange of the first and second paper supply trays when a type of the first paper supply tray is identical to a type of the second paper supply tray.

35. The computer-readable storage medium according to claim 33, wherein the advice data includes an effect for subtracting the post-exchange load from the pre-exchange load and the advice data recommends the exchange of the paper supply trays to maximize the calculated effect.

36. The computer-readable storage medium according to claim 32, wherein the advice data recommends an exchange of layout positions of the first and second printing devices when a type of the first paper supply tray is different from a type of the second paper supply tray.

37. The computer-readable storage medium according to claim 25, wherein the advice data includes:
   a cost required for at least one of the printing devices based on the performance and the previous frequency of usages when a second criteria related to a cost of at least one of the plurality of printing devices is selected; and an advice to reduce the cost of the at least one of the plurality of printing devices.

38. The computer-readable storage medium to claim 24, wherein the advice data recommends exchanging positions of a predetermined printing device and another printing device.

39. The computer-readable storage medium according to claim 24, wherein the previous frequency of usages includes an amount of toner consumption per unit time in each of the plurality of printing devices, and the performance includes a toner capacity of each of the plurality of printing devices.

40. The computer-readable storage medium according to claim 24, wherein the advice data recommends the terminal device to change an output destination of the print commands from a predetermined printing device to another printing device.

41. The computer-readable storage medium according to claim 40, wherein the advice data creates an error value when a difference between a device performance of the predetermined printing device and a device performance of the another printing device is equal to or less than the established error value.

42. The computer-readable storage medium according to claim 41, wherein the device performance includes at least a printing speed of each of the plurality of printing devices.

43. The computer-readable storage medium according to claim 41, wherein the error value is established by a user.

44. The computer-readable storage medium according to claim 40, wherein the advice data recommends a terminal device or a user thereof to change an output destination, the terminal device or the user having printing the largest volume among the predetermined printing devices.

45. The computer-readable storage medium according to claim 24, wherein the advice data recommends to correct an uneven distribution of loads on the plurality of printing devices.

46. The computer-readable storage medium according to claim 24, wherein the advice data recommends to reduce the loads on the plurality of printing devices to an average load or less.

47. The computer-readable storage medium according to claim 24, the program further comprising establishing a destination, and notifying the advice data to the established destination.

48. The computer-readable storage medium according to claim 24, the program further comprising establishing an exception period, wherein the previous frequency of usages related to the print commands outputted during the established exception period and creates advice data is ignored for creating the advice data.

49. The computer-readable storage medium according to claim 24, wherein the previous frequency of usages includes log data.

* * * * *

UNITED STATES PATENT AND TRADEMARK OFFICE
CERTIFICATE OF CORRECTION

| | | |
|---|---|---|
| PATENT NO. | : 8,023,129 B2 | Page 1 of 1 |
| APPLICATION NO. | : 10/886682 | |
| DATED | : September 20, 2011 | |
| INVENTOR(S) | : Sunao Kawai et al. | |

It is certified that error appears in the above-identified patent and that said Letters Patent is hereby corrected as shown below:

Title page, Item (54) and Col. 1, lines 1-9; Title:
"INFORMATION PROCESSING DEVICE FOR BALANCING PRINTING LOADS CONNECTED TO A PLURALITY OF PRINTING DEVICES, NETWORK PRINTING SYSTEM FOR A PLURALITY OF PRINTING DEVICES, AND COMPUTER PROGRAM FOR AN INFORMATION PROCESSING DEVICE CONNECTED TO A PLUARLITY OF PRINTING DEVICES"

Should read:
--INFORMATION PROCESSING DEVICE FOR BALANCING PRINTING LOADS CONNECTED TO A PLURALITY OF PRINTING DEVICES, NETWORK PRINTING SYSTEM FOR A PLURALITY OF PRINTING DEVICES, AND COMPUTER PROGRAM FOR AN INFORMATION PROCESSING DEVICE CONNECTED TO A PLURALITY OF PRINTING DEVICES--

Signed and Sealed this
Twenty-second Day of November, 2011

David J. Kappos
*Director of the United States Patent and Trademark Office*